(12) United States Patent
Tan et al.

(10) Patent No.: US 12,130,865 B2
(45) Date of Patent: Oct. 29, 2024

(54) EFFICIENT RETRIEVAL OF TOP SIMILARITY REPRESENTATIONS

(71) Applicant: Baidu USA, LLC, Sunnyvale, CA (US)

(72) Inventors: Shulong Tan, Santa Clara, CA (US); Zhixin Zhou, Los Angeles, CA (US); Zhaozhuo Xu, Houston, TX (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 359 days.

(21) Appl. No.: 17/023,283

(22) Filed: Sep. 16, 2020

(65) Prior Publication Data

US 2021/0117459 A1    Apr. 22, 2021

Related U.S. Application Data

(60) Provisional application No. 62/923,459, filed on Oct. 18, 2019.

(51) Int. Cl.
*G06F 16/901* (2019.01)
*G06F 16/33* (2019.01)
*G06F 18/2413* (2023.01)

(52) U.S. Cl.
CPC ...... *G06F 16/9024* (2019.01); *G06F 16/3347* (2019.01); *G06F 18/24147* (2023.01)

(58) Field of Classification Search
CPC ........... G06F 16/3347; G06F 16/24522; G06F 16/9024; G06F 18/24147; G06F 16/9027; G06K 9/6276
See application file for complete search history.

(56) References Cited

U.S. PATENT DOCUMENTS 7,296,009 B1 * 11/2007 Jiang ................... G06F 16/3347
                                                          707/999.005
10,210,180 B2    2/2019 Barel et al.
(Continued)

FOREIGN PATENT DOCUMENTS

CN    101432684 A    5/2009
CN    106549675 A    3/2017
(Continued)

OTHER PUBLICATIONS

Liu, Understanding and Improving Proximity Graph Based Maximum Inner Product Search, Apr. 3, 2020, AAAI Press, vol. 34 No. 01, 139-146.*

(Continued)

*Primary Examiner* — Apu M Mofiz
*Assistant Examiner* — J Mitchell Curran
(74) *Attorney, Agent, or Firm* — BAUGH LAW, LLC

(57) ABSTRACT

Retrieval of relevant vectors produced by representation learning can critically influence the efficiency in Natural Language Processing (NLP) tasks. Presented herein are systems and methods for searching vectors via a typical nonmetric matching function: inner product. Embodiments, which construct an approximate Inner Product Delaunay Graph (IPDG) for top-1 Maximum Inner Product Search (MIPS), transform retrieving the most suitable latent vectors into a graph search problem with great benefits of efficiency. Experiments on data representations learned for different machine learning tasks verify the outperforming effectiveness and efficiency of IPDG embodiments.

20 Claims, 18 Drawing Sheets

(56) References Cited

U.S. PATENT DOCUMENTS

| | | | |
|---|---|---|---|
| 11,309,087 B2* | 4/2022 | Holcomb | G06T 15/00 |
| 2003/0120630 A1 | 6/2003 | Tunkelang | |
| 2007/0192316 A1 | 8/2007 | Lee | |
| 2008/0172375 A1* | 7/2008 | Burges | G06F 16/334 |
| | | | 707/999.005 |
| 2019/0065594 A1* | 2/2019 | Lytkin | G06F 16/9536 |
| 2019/0377792 A1* | 12/2019 | Zhang | G06N 5/022 |
| 2021/0157851 A1* | 5/2021 | Aoyama | G06F 16/906 |

FOREIGN PATENT DOCUMENTS

| | | | |
|---|---|---|---|
| CN | 108710626 A | 10/2018 | |
| CN | 110008256 A | 7/2019 | |
| CN | 110326253 A | 10/2019 | |
| CN | 110476151 A | 11/2019 | |
| DK | 177161 B1 | 3/2012 | |
| EP | 3779733 A1 | 2/2021 | |

OTHER PUBLICATIONS

Louis Goldstein, Evaluating Similarity Using the Inner Product, Oct. 2015, Slides 1-18 (Year: 2015).*

In Proceedings of the 24th ACM SIGKDD International Conference on Knowledge Discovery & Data Mining (KDD), pp. 1561-1570, 2018. (10 pgs).

Indyk et al., "Approximate nearest neighbors: Towards removing the curse of dimensionality," In Proceedings of the 13th Annual ACM Symposium on the Theory of Computing (STOC), 1998. (10 pgs).

Johnson et al., "Billion-scale similarity search with GPUs," arXiv preprint arXiv:1702.08734, 2017. (12pgs).

Joulin et al., "Fasttext.zip: Compressing text classification models," arXiv preprint arXiv:1612.03651, 2016. (13 pgs).

Kalantidis et al., "Locally optimized product quantization for approximate nearest neighbor search," In Proceedings of the IEEE Conference on Computer Vision and Pattern Recognition (CVPR), 2014. (8 pgs).

Koper et al.,"Analogies in complex verb meaning shifts: the effect of affect in semantic similarity models," In Proceedings of the 2018 Conference of the North American Chapter of the Association for Computational Linguistics:Human Language Technologies (NAACLHLT), 2018. (7 pgs).

Lee et al., "Reasoning in vector space: An exploratory study of question answering," arXiv preprint arXiv:1511.06426, 2016. (12 pgs).

Srinivas et al., "A weighted tag similarity measure based on a collaborative weight model," In Proceedings of the 2nd International Workshop on Search and Mining User-Generated Contents, 2010. (8pgs).

Sugawara et al., "On approximately searching for similar word embeddings," In Proceedings of the 54th Annual Meeting of the Association for Computational Linguistics (ACL), 2016. (11pgs).

Sultan et al., "Bayesian supervised domain adaptation for short text similarity," In Proceedings of the 2016 Conference of the North American Chapter of the Association for Computational Linguistics: Human Language Technologies (NAACL-HLT), 2016. (10pgs).

Sun et al.,"A simple approach to learn polysemous word embeddings," arXiv preprint arXiv:1707.01793, 2017. (9 pgs).

Tan et al., "Fast Item Ranking under Neural Network based Measures," Proceedings of the 13th International Conference on Web Search and Data Mining, 2020. [Abstract] (7pgs).

Vaswani et al.,"Attention is all you need," In Advances in Neural Information Processing Systems (NIPS), 2017. (11pgs).

Wu et al., "Multiscale quantization for fast similarity search," In Advances in Neural Information Processing Systems (NIPS), 2017. (11pgs).

Levy et al., "A strong baseline for learning cross-lingual word embeddings from sentence alignments," In Proceedings of the 15th Conference of the European Chapter of the Association for Computational Linguistics, vol. 1, pp. 765-774, 2017. (10 pgs).

Li et al., "GPU-Based Minwise Hashing," In Proceedings of the 21st World Wide Web Conference (WWW), 2012. (2pgs).

Liu et al., "Representation learning using multi-task deep neural networks for semantic classification and information retrieval," In Proceedings of the 2015 Conference of the North American Chapter of the Association for Computational Linguistics: Human Language Technologies (NAACL-HLT), 2015. (10pgs).

Malkov et al., "Efficient and robust approximate nearest neighbor search using hierarchical navigable small world graphs," IEEE transactions on pattern analysis and machine intelligence, 2018. (13 pgs).

Mikolov et al., "Efficient estimation of word representations in vector space," arXiv preprint arXiv:1301.3781, 2013. (12pgs).

Mikolov et al., "Distributed representations of words and phrases and their compositionality," In Advances in Neural Information Processing Systems (NIPS), 2013. (9pgs).

Morozov et al., "Nonmetric similarity graphs for maximum inner product search," In Advances in Neural Information Processing Systems (NeurIPS),2018. (10pgs).

Pennington et al., "Glove: Global vectors for word representation," In Empirical Methods in Natural Language Processing (EMNLP), 2014. (12 pgs).

Plank et al., "Embedding semantic similarity in tree kernels for domain adaptation of relation extraction," In Proceedings of the 51st Annual Meeting of the Association for Computational Linguistics (ACL), vol. 1, pp. 1498-1507, 2013. (10pgs).

Putra et al., "Evaluating text coherence based on semantic similarity graph," In Proceedings of TextGraphs-11: the Workshop on Graph-based Methods for Natural Language Processing, pp. 76-85, 2017. (10pgs).

Ramage et al., "Random walks for text semantic similarity," In Proceedings of the 2009 workshop on graph-based methods for natural language processing, 2009. (9pgs).

Sahami et al., "A web-based kernel function for measuring the similarity of short text snippets," In Proceedings of the 15th International Conference on World Wide Web (WWW), 2006. (10pgs).

Shrivastava et al., "Asymmetric LSH (ALSH) for sublinear time maximum inner product search (MIPS)," In Advances in Neural Information Processing Systems (NIPS), 2014. (9pgs).

Shrivastava et al., "Improved asymmetric locality sensitive hashing (ALSH) for maximum inner product search (MIPS)," arXiv preprint arXiv:1410.5410, 2014. (9pgs).

Acree et al., "Comparing and evaluating cosine similarity scores, weighted cosine similarity scores and substring matching," Technical report, 2016. [Abstract] (1pg).

Agirre et al., "SemEval-2012 Task 6: A Pilot on Semantic Textual Similarity," In Proceedings of the 1st Joint Conference on Lexical & Computational Semantics (SEM), 2012.(9pgs).

F. Aurenhammer, "Voronoi Diagrams—a survey of a fundamental geometric data structure," ACM Computing Surveys (CSUR), 23(3):345-405,1991. (61pgs).

Bachrach et al., "Speeding up the Xbox recommender system using a euclidean transformation for inner-product spaces," In Proceedings of the 8th ACM Conference on Recommender systems (RecSys), 2014. (8pgs).

C. Bradford Barber et al., "The Quickhull Algorithm for Convex Hulls," ACM Transactions on Mathematical Software (TOMS), 22(4):469-483, 1996. (15pgs).

Bengio et al., "A neural probabilistic language model," Journal of Machine Learning Research, 2003. (19pgs).

Cignoni et al., "DeWall: A fast divide and conquer delaunay triangulation algorithm in Ed," Computer-Aided Design, 30(5):333-341, 1998. [Abstract] (3 pgs).

Faruqui et al., "Problems with evaluation of word embeddings using word similarity tasks," arXiv preprint arXiv:1605.02276, 2016. (6 pgs).

Friedman et al., "An algorithm for finding nearest neighbors," In IEEE Transactions on Computers, 24:1000-1006, 1975. [Abstract] (3pgs).

(56) References Cited

OTHER PUBLICATIONS

Friedman et al., "An algorithm for finding best matches in logarithmic expected time," In ACM Transactions on Mathematical Software, 3:209-226, 1977. (18 pgs).

Gao et al., "Learning continuous phrase representations for translation modeling," In Proceedings of the 52nd Annual Meeting of the Association for Computational Linguistics (ACL), vol. 1, pp. 699-709, 2014. (11pgs).

Gong et al., "Document similarity for texts of varying lengths via hidden topics," In Proceedings of the 56th Annual Meeting of the Association for Computational Linguistics (ACL), vol. 1, pp. 2341-2351, 2018. (11 pgs).

Guo et al., "Quantization based fast inner product search," In Artificial Intelligence and Statistics (AISTATS), pp. 482-490, 2016. (9pgs).

Hu et al., "Collaborative filtering for implicit feedback datasets," In Proceedings of the Eighth IEEE International Conference on Data Mining (ICDM), 2008. (10 pgs).

Huang et al., "Learning deep structured semantic models for web search using clickthrough data," In Proceedings of the 22nd ACM International Conference on Information Knowledge Management (CIKM), 2013. (8pgs).

Huang et al., "Accurate and fast asymmetric locality-sensitive hashing scheme for maximum inner product search,".

G. T. Toussaint, "The relative neighbourhood graph of a finite planar set," Pattern recognition, 12(4):261-268, 1980. [Abstract] (3pgs).

Wang et al., "Flash: Randomized algorithms accelerated over CPUGPU for ultra-high dimensional similarity search," arXiv preprint arXiv:1709. 01190, 2018. (15 pgs).

Wang et al., "Gunrock: A high-performance graph processing library on the gpu," In Sigplan 2016. (12 pgs).

Wu et al., "Multiscale quantization for fast similarity search," In NIPS, 2017. (11pgs).

Wu et al., "Fast and unified local search for random walk based knearest-neighbor query in large graphs," In SIGMOD, 2014. (12pgs).

Zhang et al., "Finepar: Irregularity-aware fine-grained workload partitioning on integrated architectures," In CGO, 2017. (13 pgs).

Zheng et al., "Lazylsh: Approximate nearest neighbor search for multiple distance functions with a single index," In SIGMOD, 2016. (15 pgs).

Zhou et al., "Mobius transformation for fast inner product search on graph," In NeurIPS, 2019. (12 pgs).

Groh et al., "GGNN: Graph-based GPU Nearest Neighbor Search," arXiv preprint arXiv:1912.01059, 2019. (10pgs).

Wang et al., "A Comprehensive Survey and Experimental Comparison of Graph-Based Approximate Nearest Neighbor Search," arXiv preprint arXiv: 2101.12631, 2021. (22pgs).

Non-Final Office Action mailed Aug. 3, 2022, in related U.S. Appl. No. 17/033,791 (10pgs).

Naidan et al., "Permutation Search Methods are Efficient, Yet Faster Search is Possible," arXiv preprint arXiv: 1506.03163v1, 2015. (13 pgs).

Hyvonen et al., "Fast Nearest Neighbor Search through Sparse Random Projections and Voting," In 2016 IEEE International Conference on Big Data (Big Data), 2016. (8 pgs).

Non-Final Office Action mailed Oct. 5, 2022, in related U.S. Appl. No. 17/095,548 (8pgs).

Weston et al., "Large scale image annotation: learning to rank with joint word-image embeddings," Machine Learning, 2010. (16 pgs).

Xue et al.,"Deep matrix factorization models for recommender systems," In Proceedings of the 26th International Joint Conference on Artificial Intelligence (IJCAI), 2017.(7pgs.

Yan et al., "Norm-ranging LSH for maximum inner product search," In Advances in Neural Information Processing Systems (NeurIPS), 2018. (10pgs).

Yu et al., "A greedy approach for budgeted maximum inner product search," In Advances in Neural Information Processing Systems (NIPS), 2017. (10pgs).

Yu et al., "Large-scale multi-label learning with missing labels," In Proceedings of the 31th International Conference on Machine Learning (ICML), 2014. (9pgs).

Zhao et al., "Song: Approximate Nearest Neighbor Search on GPU," In 35th IEEE International Conference on Data Engineering (ICDE) [Abstract], 2020. (3pgs).

Neyshabur et al., "On symmetric and asymmetric lshs for inner product search," In Proceedings of the 32nd International Conference on Machine Learning (ICML), 2015. (9pgs).

Ram et al., "Maximum inner-product search using cone trees," In The 18th ACM SIGKDD International Conference on Knowledge Discovery & Data Mining (KDD), 2012. (9pgs).

Shrivastava et al., "Asymmetric LSH (ALSH) for sublinear time maximum inner product search (MIPS)," arXiv preprint arXiv:1405. 5869, 2014. (19pgs).

Shrivastava et al., "Asymmetric minwise hashing for indexing binary inner products and set containment," In Proceedings of the 24th International Conference on World Wide Web (WWW), 2015. (11pgs).

Shrivastava et al., "Improved asymmetric locality sensitive hashing (ALSH) for maximum inner product search (MIPS)," In Proceedings of the 31st Conference on Uncertainty in Artificial Intelligence (UAI), 2015. (10pgs).

Tan et al., "On Efficient Retrieval of Top Similarity Vectors," In Proceedings of the 2019 Conference on Empirical Methods in Natural Language Processing (EMNLP), 2019. (11pgs).

Tan et al., "Fast item ranking under neural network based measures," In Proceedings of the 13th ACM International Conference on Web Search & Data Mining (WSDM), 2020. (9pgs).

Bachrach et al., "Speeding up the Xbox recommender system using a Euclidean transformation for inner-product spaces," In 8th ACM Conference on Recommender Systems (RecSys), 2014. (8pgs).

Barber et al., "The Quickhull Algorithm for Convex Hulls," ACM Transactions on Mathematical Software (TOMS), 22(4):469-483,1996. (15pgs).

Beaumont et al.,"VoroNet: A scalable object network based on voronoi tessellations," In 21th International Parallel & Distributed Processing Symposium (IPDPS), 2007. (10pgs).

Bengio et al., "A Neural Probabilistic Language Model," Journal of Machine Learning Research, 3:1137-1155, 2003. (19pgs).

L. Cayton, "Fast Nearest Neighbor Retrieval for Bregman Divergences," In Proceedings of the 25th International Conference on Machine learning (ICML), 2008. (8pgs).

Curtin et al., "Dual-Tree Fast Exact Max-Kernel Search," Statistical Analysis and Data Mining: The ASA Data Science Journal, 7(4):229-253, 2014. (25pgs).

Curtin et al., "Fast Exact Max-kernel Search," arXiv preprint arXiv: 1210.6287, 2012. (12pgs).

De Vries et al., "Efficient k-NN search on vertically decomposed data," In SIGMOD, 2002. (12pgs).

Dearholt et al., "Monotonic search networks for computer vision databases," In ACSSC, 1988. [Abstract] (6 pgs).

Fan et al., "Cuckoo filter: Practically better than bloom," In CoNEXT, 2014. (13pgs).

Fan et al., "Mobius: towards the next generation of query-ad matching in baidu's sponsored search," In KDD 2019. [Abstract] (5 pgs).

Friedman et al., "An algorithm for finding nearest neighbors," IEEE Transactions on Computers, 24:1000-1006, 1975. (22pgs).

Friedman et al., "An algorithm for finding best matches in logarithmic expected time," ACM Transactions on Mathematical Software, 3:209-226, 1977. (18pgs).

Fu et al., "Efanna: An extremely fast approximate nearest neighbor search algorithm based on knn graph," arXiv preprint arXiv:1609. 07228, 2016. (20pgs).

Fu et al., "Fast approximate nearest neighbor search with the navigating spreading-out graph," arXiv preprint arXiv:1707.00143, 2018. (21pgs).

Fu et al., "MapGraph: A High Level API for Fast Development of High Performance Graph Analytics on GPUs," In GRADES, 2014. (6pgs).

(56) References Cited

OTHER PUBLICATIONS

Xu et al., "Deep learning for matching in search and recommendation," In The 41st International ACM SIGIR Conference on Research and Development in Information Retrieval (SIGIR), 2018. (55pgs).
Yan et al., "Norm-ranging lsh for maximum inner product search," In Advances in Neural Information Processing Systems (NeurIPS), 2018. (10pgs).
Yoon et al., "Synonym discovery with etymology-based word embeddings," arXiv preprint arXiv:1709.10445, 2017. (6pgs).
Yu et al., "A greedy approach for budgeted maximum inner product search," arXiv preprint arXiv:1610.03317, 2016. (21pgs).
Zhao et al., "Song: Approximate Nearest Neighbor Search on GPU," 2020 IEEE 36th International Conference on Data Engineering (ICDE), 2020. (12pgs).
Garcia et al., "Fast k nearest neighbor search using gpu," arXiv preprint arXiv:0804.1448, 2008. (15pgs).
Garcia et al.,"K-nearest neighbor search: Fast GPU-based implementations and application to high-dimensional feature matching," In ICIP, 2010. (4pgs).
Ge et al., "Optimized product quantization for approximate nearest neighbor search," In CVPR, 2013. (8pgs).
Gionis et al., "Similarity search in high dimensions via hashing," In VLDB, 1999. (12pgs).
Goemans et al., "Improved approximation algorithms for maximum cut and satisfiability problems using semidefinite programming," Journal of ACM, 42(6):1115-1145, 1995. (31pgs).
Hajebi et al., "Fast approximate nearest-neighbor search with k-nearest neighbor graph," In IJCAI, 2011. (6 pgs).
Hart et al., "A formal basis for the heuristic determination of minimum cost paths," IEEE transactions on Systems Science and Cybernetics, 1968. [Abstract] (2 pgs).
He et al., "In-cache query co-processing on coupled cpu-gpu architectures," VLDB, 2014. (12pgs).
Hong et al.,"Accelerating cuda graph algorithms at maximum warp," In SIGPLAN, 2011. (10 pgs).
Huang et al., "Query-aware locality-sensitive hashing for approximate nearest neighbor search," VLDB, 2015. (13pgs).
Indyk et al., "Approximate nearest neighbors: Towards removing the curse of dimensionality," In STOC, 1998. (10 pgs).
Jegou et al.,"Product quantization for nearest neighbor search," IEEE transactions on pattern analysis and machine intelligence, 33(1):117-128, 2011. (14pgs).
Jegou et al., "Hamming embedding and weak geometric consistency for large scale image search," In ECCV, 2008. (15pgs).
Jia et al., "Dissecting the NVIDIA volta GPU architecture via microbenchmarking," arXiv preprint arXiv:1804.06826, 2018. (66 pgs).
Jin et al., "Fast and accurate hashing via iterative nearest neighbors expansion," IEEE Trans. Cybernetics, 44(11):2167-2177, 2014. [Abstract] (3 pgs).
Khorasani et al., "CuSha: Vertex-centric graph processing on GPUs," In HPDC, 2014. (13pgs).
Kim et al.,"Gts: A fast and scalable graph processing method based on streaming topology to GPUs," In SIGMOD, 2016. [Abstract] (4pgs).
P. Li., "Linearized GMM kernels and normalized random Fourier features," In KDD 2017, 2017. (10pgs).
Li et al., "Sign cauchy projections and chi-square kernel," In NIPS 2013. (9pgs).
Li et al., "GPU-based minwise hashing:Gpu-based minwise hashing," In WWW 2012, 2012. [Abstract] (4pgs).
W. Li et al., "Approximate nearest neighbor search on high dimensional data: Experiments, analyses, and improvement," arXiv preprint arXiv:1610.02455, 2016. (26pgs).
W. Litwin, "Linear hashing: a new tool for file and table addressing," In VLDB, 1980. (12pgs).
H. Liu et al., "iBFS: Concurrent Breadth-First Search on GPUs," In SIGMOD, 2016. (14 pgs).
Liu et al., "Enterprise: Breadth-first graph traversal on gpus," In SC, 2015. (12pgs).
Malkov et al., "Approximate nearest neighbor algorithm based on navigable small world graphs," Information Systems, 45:61-68, 2014. (8 pgs).
D. Merrill et al., "Scalable GPU graph traversal," In SIGPLAN, 2012. (11pgs).
M. Mitzenmacher, "Compressed bloom filters," IEEE/ACM Transactions on Networking (TON), 10(5):604-612, 2002. (9 pgs).
Morozov et al.,"Non-metric similarity graphs for maximum inner product search," In NIPS, 2018. (10pgs).
Muja et al., "Scalable nearest neighbor algorithms for high dimensional data," Pattern Analysis and Machine Intelligence, IEEE Transactions on, 36, 2014. (14pgs).
Ram et al., "Maximum inner-product search using cone trees," In KDD, 2012. (9pgs).
H. Seo et al., "GStream: A graph streaming processing method for large-scale graphs on GPUs," In SIGPLAN, 2015. (43pgs).
X. Shi et al.,"Graph processing on gpus: A survey," CSUR, 2018. (35pgs).
X. Shi et al., "Optimization of asynchronous graph processing on GPU with hybrid coloring model," SIGPLAN, 2015. (3pgs).
Shrivastava et al., "Fast near neighbor search in high-dimensional binary data," In ECML, 2012. (38pgs).
Tan et al., "Fast item ranking under neural network based measures," In WSDM, 2020. [Abstract] (3pgs).
Tan et al., "On efficient retrieval of top similarity vectors," In EMNLP, 2019. (11pgs).
Teodoro et al., "Approximate similarity search for online multimedia services on distributed CPU-GPU platforms," arXiv preprint arXiv:1209.0410, 2012. (25pgs).
Andoni et al., "Practical and optimal LSH for angular distance," In NIPS, 2015. (16pgs).
Arora et al., "HD-Index: Pushing the scalability-accuracy boundary for approximate KNN search in high-dimensional spaces," arXiv preprint arXiv:1804.06829, 2018. (16pgs).
Arvind et al., "Symmetric min-max heap: a simpler data structure for double-ended priority queue," Information Processing Letters, 69(4):197-199, 1999. (3pgs).
Aumuller et al., "Ann-benchmarks: A benchmarking tool for approximate nearest neighbor algorithms," arXiv preprint arXiv:1807.05614, 2018. (20pgs).
F. Aurenhammer,"Voronoi diagrams—A survey of a fundamental geometric data structure," ACM Computing Surveys, vol. 23, No. 3, Sep. 1991. (61pgs).
Baranchuk et al., "Revisiting the Inverted Indices for Billion-Scale Approximate Nearest Neighbors," In ECCV, 2018. (15pgs).
A. Z. Broder, "On the resemblance and containment of documents," In the Compression and Complexity of Sequences, 1997. (9pgs).
L. Cayton, "Fast nearest neighbor retrieval for bregman divergences," In ICML, 2008. (8pgs).
M. S. Charikar, "Similarity Estimation Techniques from Rounding Algorithms," In STOC, 2002. (9pgs).
Chen et al., "Robust and fast similarity search for moving object trajectories," In SIGMOD, 2005. (12pgs).
Indyk et al., "Approximate nearest neighbors: Towards removing the curse of dimensionality," In Proceedings of the 30th Annual ACM Symposium on the Theory of Computing (STOC) [Abstract], 1998. (3pgs).
J. Kleinberg, "The small-world phenomenon: an algorithmic perspective," In Proceedings of the 32nd Annual ACM Symposium on Theory of Computing (STOC), 2000. (14pgs).
Kühnel et al.,"Liouville's theorem in conformal geometry," Journal de mathématiques pures et appliquées, 88(3):251-260, 2007. (10pgs).
Li et al., "GPU-Based Minwise Hashing: GPU-based minwise hashing," In Proceedings of the 21st World Wide Web Conference (WWW) [Abstract], 2012. (2 pgs).
Malkov et al., "Approximate nearest neighbor algorithm based on navigable small world graphs," Information Systems, [Abstract] 2014. (2pgs).
Fan et al., "Mobius: Towards the Next Generation of Query-Ad Matchingin Baidu's Sponsored Search," In Proceedings of the 25th

(56) References Cited

OTHER PUBLICATIONS

ACM SIGKDD International Conference on Knowledge Discovery & Data Mining, (KDD), 2019. (9pgs).

S. Fortune, "Voronoi diagrams and delaunay triangulations," In Handbook of Discrete & Computational Geometry, 1995. (12pgs).

Friedman et al., "An algorithm for finding nearest neighbors," IEEE Transactions on Computers [Abstract], 1975. (3pgs).

Friedman et al., "An algorithm for finding best matches in logarithmic expected time," ACM Transactions on Mathematical Software, 1977. (39pgs).

George et al.,"Delaunay triangulation and meshing," 1998. (1pg).

Guo et al., "Quantization based Fast Inner Product Search," arXiv preprint arXiv:1509.01469, 2015. (17pgs).

He et al., "Neural Collaborative Filtering," arXiv preprint arXiv:1708.05031, 2017. (10pgs).

Hu et al., "Collaborative filtering for implicit feedback datasets," In Proceedings of the 8th IEEE International Conference on Data Mining (ICDM), 2008. (10pgs).

Non-Final Office Action mailed Jul. 17, 2023, in related U.S. Appl. No. 17/033,791. (11pgs).

Boytsov et al.,"Off the beaten path : Let's replace term-based retrieval with k-NN search," arXiv preprint arXiv:1610.10001v1, 2016. (12pgs).

Kennes et al., "Computational aspects of the Mobius transform," arXiv preprint arXiv: 1304.1122, 2013. (8pgs).

Final Office Action mailed Jan. 24, 2023, in related U.S. Appl. No. 17/033,791. (21pgs).

Yan et al., "Norm-Ranging LSH for Maximum Inner Product Search," In 32nd Conference on Neural Information Processing Systems (NeurIPS ), 2018. (10 pgs).

Response filed Jan. 4, 2023, in related U.S. Appl. No. 17/095,548. (13pgs).

Notice of Allowance & Fee(s) Due mailed Mar. 31, 2023, in related U.S. Appl. No. 17/095,548. (7pgs).

Response filed Apr. 24, 2023, in related U.S. Appl. No. 17/033,791. (19pgs).

Notice of Allowance & Fee(s) Due mailed May 17, 2023, in related U.S. Appl. No. 17/095,548. (7pgs).

Chinese Office Action dated Aug. 30, 2023, in Chinese Application No. 202011119294.1 (30pgs).

Morozov et al., "Non-metric Similarity Graphs for Maximum Inner Product Search," In 32nd Conference on Neural Information Processing Systems (NeurIPS), 2018. (10pgs).

Notice of Allowance & Fee(s) Due mailed Sep. 6, 2023, in related U.S. Appl. No. 17/095,548. (7pgs).

Response to Non-Final Office Action filed Oct. 17, 2023, in related U.S. Appl. No. 17/033,791. (21 pgs).

Notice of Allowance & Fee(s) Due mailed Jan. 8, 2024, in related U.S. Appl. No. 17/033,791. (19pgs).

Shao et al., "Challenges and techniques for effective and efficient similarity search in large video databases," Proceedings of the VLDB Endowment, 2008. (6pgs).

Potamias et al., "Nearest-neighbor Queries in Probabilistic Graphs," [online], [Retrieved Jan. 10, 2024]. Retrieved from Internet <URL:https://open.bu.edu/bitstream/handle/2144/1748/2009-024-probabilistic-graph-queries.pdf?sequence=1&isAllowed=y>, 2009. (13pgs).

Notice of Allowance & Fee(s) Due, mailed Nov. 21, 2023, in related U.S. Appl. No. 17/095,548. (7pgs).

* cited by examiner

305

EFFICIENT RETRIEVAL OF TOP SIMILARITY REPRESENTATIONS

CROSS-REFERENCE TO RELATED APPLICATION

This patent application is related to and claims priority benefit under 35 USC § 119 to commonly-owned U.S. Pat. App. No. 62/923,459, filed on Oct. 18, 2019, entitled "Efficient Retrieval of Top Similarity Representations," and listing Shulong Tan, Zhixin Zhou, Zhaozhuo Xu, and Ping Li as inventors, which patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to systems and methods for efficient retrieval of similarity representations.

B. Background

In natural language processing (NLP) and other machine learning applications, finding similar objects, such as vectors, is an important task. Consider, by way of example, representation learning methods. With the popularity of representation learning methods, such as Word2vec, words are represented as real-valued embedding vectors in the semantic space. Therefore, retrieval of similar word embeddings is one of the most basic operations in natural language processing with wide applicability in synonym extraction, sentence alignment, polysemous word learning, and semantic search for documents related to a query.

Accordingly, what is needed are systems and methods for efficient retrieval of similarity representations, such as vectors.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1:
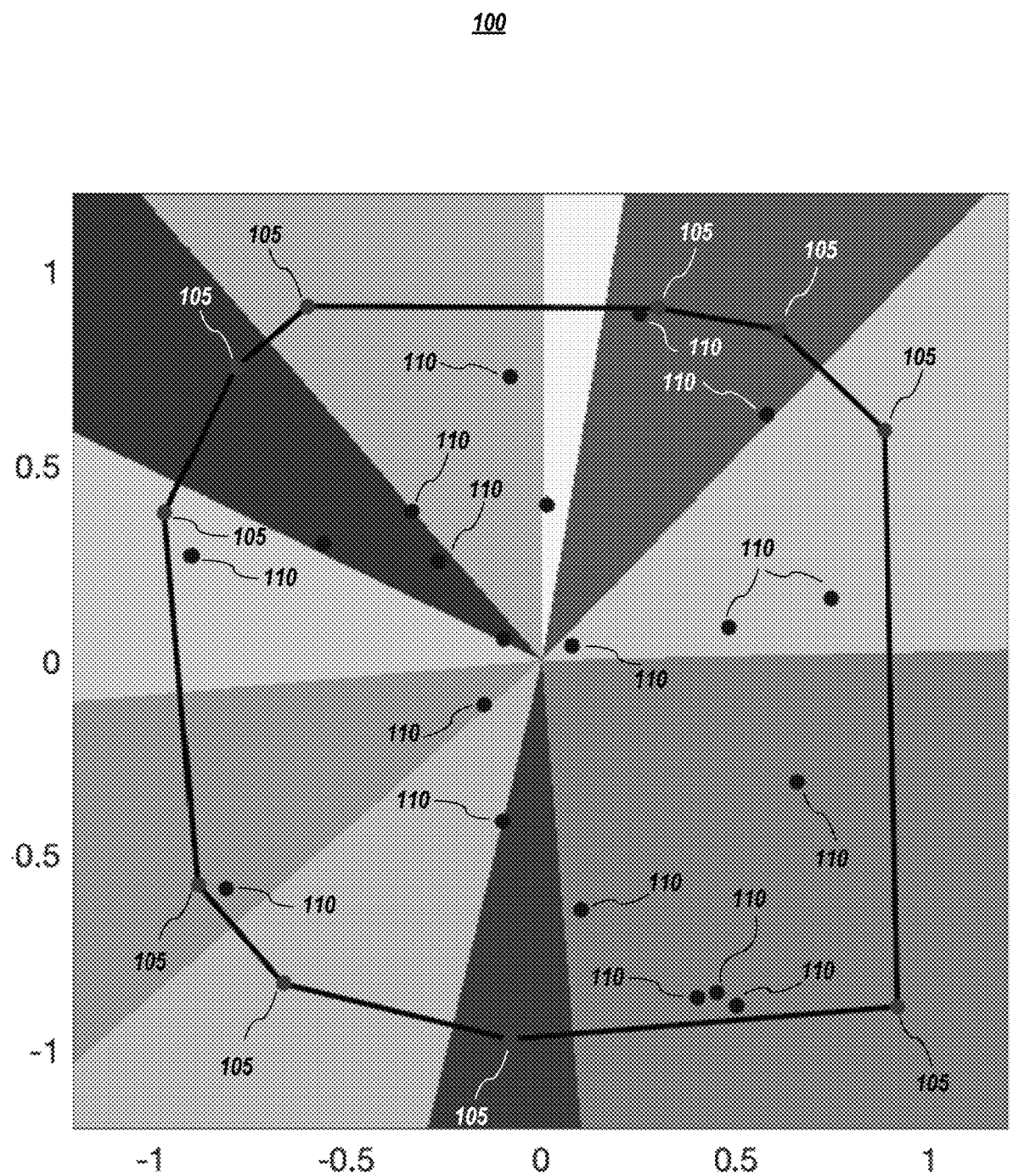
FIG. 1 shows the relation between Delaunay Graph and Voronoi cells in inner product space.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

It shall also be noted that although embodiments described herein may be within the context of word embeddings, aspects of the present disclosure are not so limited. Accordingly, the aspects of the present disclosure may be applied or adapted for use in other contexts, such as, for example, recommendation, ad ranking, question answering, and machine learning model training.

A. General Introduction

Efficient retrieval of similar representations, such as word embeddings and other representations, comprises inner product (dot product) similarity. Inner product refers to a general semantic matching function with applications in neural probabilistic language models, machine translation, question answering, and attention mechanisms. For normalized vectors, inner product may be considered as being equivalent to cosine similarity, which is a common semantic textual similarity utilized in semantic classification and search, Relation Extraction (RE) and text coherence evaluation. For un-normalized vectors, although cosine similarity is still widely applied, the final matching scores of word embeddings are usually weighted by ranking-based coefficients (e.g., the side information), which transforms the problem back to search via inner product, as illustrated by Eq. (2) below.

Formally, retrieving the most similar word with the inner product ranking function is a Maximum Inner Product Search (MIPS) problem. MIPS is a continuously addressed topic, and it has non-trivial differences with traditional Approximate Nearest Neighbor Search (ANNS) problems. ANNS is an optimization problem for finding close points to a query point in a given set. Usually, "close" means smaller in metric distance, such as cosine or Euclidean distance, which has obvious geometrical implications. In contrast, inner product is a typical non-metric measure, which distinguishes MIPS from traditional ANNS problems. Thus, methods designed for ANNS may have performance limitations in MIPS. For NLP tasks, such as retrieving relevant word embeddings by cosine and Euclidean distances, different ANNS methods have been studied. However, there appears to be little literature on MIPS for retrieving word or language representations.

Currently, search on graph methods, such as HNSW, is regarded as the state-of-the-art ANNS method. Performance evaluation has demonstrated that HNSW is able to strongly outperform other ANNS method benchmarks for metric distances. Meanwhile, the graph structure also has the flexibility of defining measures on edges, thus, making HNSW feasible for MIPS. Some conducted HNSW for MIPS and achieved positive results, and they also introduced concepts of Delaunay Graph to explain similarity-graph-based methods for MIPS. Nevertheless, the link between HNSW and Delaunay Graph remains tenuous. Although global optima of MIPS can be retrieved by using a Delaunay Graph, there is little evidence showing that HNSW approximates a proper Delaunay Graph for inner product. How to provide a solid graph-based MIPS method is, thus, still an open question.

In this patent document, embodiments of a new search on graph method, namely Inner Product Delaunay Graph (IPDG), for MIPS is set forth. Some of the contributions include the embodiments that:

design an edge selection methodology specifically for inner product that reduces useless edges on graph and, thus, improves the searching efficiency;

use a two-rounds graph construction methodology for effectively approximating a Delaunay Graph using inner product;

empirically evaluate the effectiveness and efficiency of embodiments; and provide embodiments of a state-of-the-art MIPS method for similarity search.

In section B, some research background is introduced. In Section C, embodiments of the approximate IPDG are introduced. In Section D, the effectiveness and efficiency of IPDG is explored in maximum inner product word retrieval, and the results are compared with state-of-the-art MIPS methods.

B. General Background Information

In this section, a definition of MIPS is presented and the some of the state-of-the-art methods for MIPS are reviewed. Then, a theoretical solution for MIPS by searching on the Delaunay Graph is summarized.

1. Problem Statement

In machine learning tasks, embedding methods, such as Word2vec, Glove, or deep collaborative filtering, learn representations of data as dense distributed real-value vectors. Formally, for latent space $X \subset \mathbb{R}^d$, given an arbitrary query vector $q \in X$ and a set of vectors $S = \{x_1, \ldots, x_n\} \subset X$, vector similarity may be defined as a continuous symmetric matching function $f: X \times X \to \mathbb{R}$. A goal of similar vector retrieval is to find:

$$\operatorname*{argmax}_{x \in S} f(x, q). \qquad \text{Eq. (1)}$$

In this patent document, the non-metric similarity measure, inner product, is discussed:

$$f(x,q) = x^T q, \; x,q \in X = \mathbb{R}^d \setminus \{0\}$$

Without loss of the generality, it can be assumed that $\|q\|=1$. The zero vector is not of interest since its inner product with any vector is always zero. In the literature, a problem in Eq. (1) with respect to the inner product is often referred to as MIPS.

The weighted cosine ANNS problem can also be viewed as the MIPS problem. Consider a dataset $S=\{(z_i, w_i): i \in [n]\}$, where $w_i$ is a real scalar and $z_i$ is a vector, $$w \cos(z, q) = w \frac{z^T q}{\|z\| \|q\|} = \frac{w z^T}{\|z\|} \frac{q}{\|q\|}, \quad \text{Eq. (2)}$$

where $\|q\|=1$. As can be seen, weighted ANNS with respect to cosine similarity is equivalent to MIPS by letting $x_i = w_i z_i / \|z_i\|$.

2. Related Work

Previous approaches for MIPS may be mainly categorized into: (1) reducing MIPS to ANNS; and (2) non-reduction methods. Reduction methods add wrappers on indexed data and queries asymmetrically and reduce the MIPS problem to ANNS in metric spaces. For example, given the query q, the indexed data $S=\{x_1, \ldots, x_n\}$ and $\Phi = \max_i \|x_i\|$, the wrapper may be defined as:

$$P(x) = [x/\Phi; \sqrt{1-\|x\|^2/\Phi^2}], \quad \text{Eq. (3)}$$

$$Q(q) = [q; 0] \quad \text{Eq. (4)}$$

It is not difficult to prove that searching on the new data by cosine or $l_2$-distance is equal to searching on the original data by inner product. Recently, researchers found that the methods above can be improved further, based on the observation of the long tail distribution in data norms. New approaches have been proposed by adding wrappers for each norm range, such as Range-LSH. With reductions like the above one, any ANNS methods may be applied for MIPS. However, it was shown that there are performance limitations for the reduction MIPS methods.

Recently, more and more non-reduction methods are proposed, specifically for MIPS. Some have proposed a MIPS method based on Product Quantization (PQ). Others used an upper bound of inner product as the approximation of MIPS and designed a greedy search method to find this approximation, called Greedy-MIPS. Graph-based non-reduction MIPS method, ip-NSW, was firstly introduced by Stanislav Morozov and Artem Babenko in "Nonmetric Similarity Graphs For Maximum Inner Product Search," in *Advances in Neural Information Processing Systems* (*NeurIPS*), pages 4722-31 (2018), and the theoretical basis for conducting MIPS by similarity graph was also provided. Continuing of the advantages of similarity graph-based methods for ANNS, ip-NSW showed superior performance for MIPS.

3. Delaunay Graph

Delaunay Graph plays an important role in the similarity search. The properties and construction of $l^2$-Delaunay Graph have been considered in literature. Indeed, one may generalize the definition to any real binary function, including inner product.

Definition 2.1. The Voronoi cell $R_i$ with respect to $f$ and $x_i$ is the set $$R_i := \{q \in X : f(x_i, q) \geq f(x, q) \text{ for all } x \in S\}.$$

Moreover, $x \in S$ is an extreme point if it is associated with a nonempty Voronoi cell.

Definition 2.2. The Delaunay Graph G with respect to $f$ and S is an undirected graph with vertices S satisfying $\{x_i, x_j\} \in G$ if and only if $R_i \cap R_j \neq \emptyset$.

An example of Voronoi cells and corresponding Delaunay Graph in inner product space is shown in FIG. 1. Regions in different shades correspond to Voronoi cells for extreme points (e.g., points 105). Delaunay Graph 100 in FIG. 1 connects extreme points with black edges. If one searches on this dataset, every query has a maximum inner product with one of these extreme points (i.e., the exterior ones 105). Different from metric similarities (e.g., $l^2$-norm), the Voronoi cells of some data points with respect to inner product are possibly empty. By Definition 2.2, a data point is isolated (i.e., has no incident edges) if its Voronoi cell is empty. As seen in FIG. 1, there are many isolated points (e.g., dots 110). The proportion of extreme points is relatively small in general. And Theorem 2.1 below illustrates that only extreme points can achieve a maximum inner product score for any nonzero query.

The definition of an extreme point may be set as $x \in S$ is extreme if and only if x is on the boundary of the convex hull of S. In the two-dimensional cases, the edges form the boundary of the convex hull, which is also shown in FIG. 1.

4. Search on Delaunay Graph

Searching on the Delaunay Graph has been demonstrated effective for similarity search. In the inner product case, given any query vector $q \in X$, one may start from an extreme point, then move to its neighbor that has a larger inner product with q. This step may be repeated until an extreme point that has a larger inner product with q than all its neighbors is obtained and returned. It can be demonstrated this returned local optimum is actually the global optimum.

Generally, for any searching measure $f$, if the corresponding Voronoi cells are connected, then the local optimum returned by the greedy search is also the global optimum. Formally, the statement may be summarized as below. The proof can be found in Morozov and Babenko (2018), which was referenced above.

Theorem 2.1. Suppose $f$ satisfies that the Voronoi cells $R_i$ with respect to any subsets of S (including S itself) are connected on X, and G is the Delaunay Graph with respect to $f$ and some S, then for $q \in X$, a local maximum in the greedy search starting from an extreme point, that is, $x_i \in S$ satisfies $$f(x_i, q) \geq \max_{x \in N(x_i)} f(x, q), \quad (5)$$

where $N(x_i) = \{x \in S : \{x_i, x\} \in G\}$ is a global maximum.

Suppose the assumptions (i.e., connected Voronoi cells) in Theorem 2.1 hold, it can be said that searching on Delaunay Graph can find the global maximum. It is easy to check that the assumptions hold for the inner product case since the Voronoi cells with respect to the inner product are either empty or a convex cone, so they are connected. Then, it may be claimed that searching on Delaunay Graph using inner product, the vector in S that has the maximum inner product with the query vector will be retrieved.

C. Inner Product Delaunay Graph Embodiments

Although the Delaunay Graph has demonstrated its potential in similarity search, the direct construction of the Delaunay Graph in large scale and high dimensional datasets is unfeasible due to the exponentially growing number of edges in high dimension. To remedy this issue, practical methods usually approximate Delaunay Graphs. In this section, embodiments of a new methodology for constructing approximate Delaunay Graph in inner product space— which may be referred to generally, for convenience, as IPDG or IPDG embodiments—are presented. Two of the features of this methodology are introduced first: (i) edge selection specifically for inner product; and (ii) the two rounds graph construction. Then, a case study is conducted on a toy dataset to show the effectiveness of IPDG in constructing better approximate Delaunay Graphs for inner product.

1. Edge Selection for Inner Product

To balance the effectiveness (e.g., retrieval of the nearest neighbor) and the efficiency (e.g., complete the process within limited time) of the retrieval, some empirical tricks are usually applied in previous search on graph methods: a) using directed edges instead of undirected edges; b) restricting the degree of outgoing edges for each node; and c) selecting more diverse outgoing edges.

Specifically, for the inner product case, ip-NSW applies all tricks listed above (although it was not mentioned in Morozov and Babenko (2018), referenced above, the implementation did inherit all features from HNSW). The edge selection method is important for the trade-off of effectiveness and efficiency in searching. However, the existing edge selection techniques used in HNSW and ip-NSW are designed for metric distances, which are inapplicable for non-metric measures, e.g., inner product, according to various embodiments of the present disclosure.

Figure 2B:
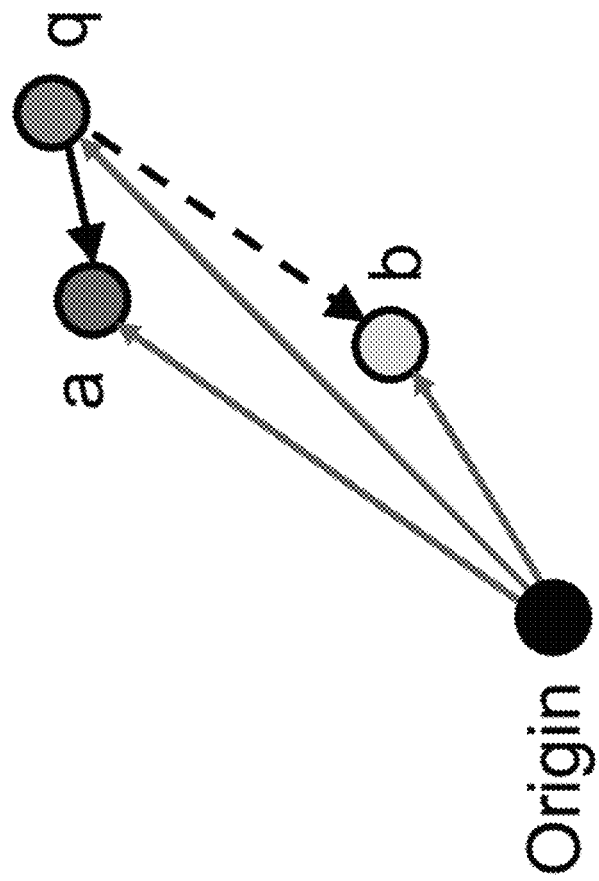
FIG. 2B depicts edge selection using inner product Delaunay Graph (IPDG) according to embodiments of the present disclosure.
Figure 2A:
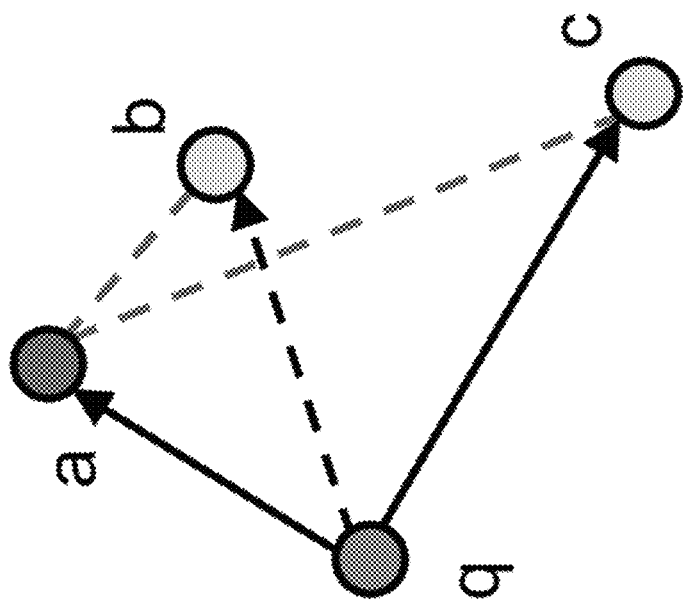
FIG. 2A depicts the selection method for metric spaces used in Hierarchical Navigable Small World (HNSW) and ip-NSW.

FIG. 2A depicts the selection method for metric spaces used in HNSW and ip-NSW, in which c is selected while b is abandoned since it is not diverse from a. As shown in FIG. 2A, the edge selection for metric spaces works as follows: for each new inserting node (or edge updating node) that is to be added or inserted into a graph, a and its nearest neighbor set (candidates) from Method 2 below, a directed edge from a to the nearest neighbor a is constructed first. For other candidates, say b, the edge selection method will check whether:

$$dis(q,b) < dis(a,b), \quad (6)$$

where dis(•, •) is the distance of two vectors, such as $l_2$-distance or angular distance. If it is true, there will be an edge from a to b, otherwise, b will be abandoned in the selection. By this way, in a restricted degree, the new inserting node will have diverse outgoing neighbors. As shown in FIG. 2A, b is not selected while c is selected. It is obvious that the edge selection method for metric spaces is not suitable for inner product.

FIG. 2B depicts edge selection using IPDG according to embodiments of the present disclosure, in which b will be ignored because a is a "super" point of it, which has been selected. As presented in FIG. 2B, although $q^T b > a^T b$ (corresponding to dis(q,b)<dis(a,b)), b should not be selected, since $a^T b > b^T b$ and for any query vector a' with all positive elements, one has $q'^T a > q'^T b$. This means that b is dispensable in the top-1 MIPS task, and the edge from a to b should not be constructed. To solve this issue, a new edge selection methodology is presented herein, which comprises determining whether $$b^T b > a^T b \quad (7)$$

and if so, b may be selected. Otherwise, b may be skipped since a is a super point of b and b is, thus, dispensable. In this way, each inserting node will tend to connect with extreme points but not other short norm vectors. A detailed method embodiment is summarized in Method 1, lines 17-28.

Method 1—IPDG Construction

```
1:   Input: dataset S, the size of candidate size N, maximum outgoing
     degree of graph M.
2:   Initialize graph G=Ø, round = 0
3:   while round < 2 do
4:      round = round +1
5:      for each x in S do
6:         A← GREEDY_SEARCH(x, G, N).
7:         B← EDGE_SELECTION(A, M).
8:         Add edges xy to G for every y ∈ B.
9:         for each y in B do ▷ Edge Updating
10:           C← {z ∈ S: yz ∈ G} ∪ {x}.
11:           D← EDGE_SELECTION(C, M).
12:           Remove original outgoing edges of y; add edges yz to G for
                z ∈ D.
13:        end for
14:     end for
15:  end while
16:  Output Graph G.
17:  function EDGE_SELECTION(A, M).
18:     B=Ø.
19:     for y ∈ A do
20:        if $y^T y \geq \max_{z \in B} y^T z$ then
21:           B = B ∪ {y}.
22:        end if
23:        if |B| ≥ M then
24:           Break.
25:        end if
26:     end for
27:     Output: B.
28:  end function
```

2. Two-Round Construction

Based on the new edge selection methodology introduced above (and the reverse edge updating, see Method 1, lines 9-13), nodes with larger norms will have higher probabilities to be selected as outgoing neighbors. So, extreme points of the dataset will have more incoming edges and non-extreme points will more likely have no incoming edges in general. This is consistent with the true Delaunay Graphs in inner product space as previously shown in FIG. 1.

However, at beginning of the graph construction, relatively super points are not true extreme points. Vectors coming in later may be better candidates (i.e., true extreme points). This issue may damage the overall graph quality and affect the final searching performance. In one or more embodiments, a straightforward method may help: inserting data points with larger norms first. This approach was tried, but it did not achieve sufficiently satisfactory results. One reason is that high norm points are not necessarily extreme points. Norms of extreme points for some Voronoi cells may be relatively small. The top large norm points may be just from one or a few Voronoi cells. In high dimensional data, it is difficult to find true extreme points.

Alternatively, in one or more embodiments, a two rounds construction methodology was developed to solve this issue, and the additional round construction was also exploited to update edges, especially for nodes inserted in the beginning. In this way, the graph construction methodology may detect extreme points automatically. A two rounds construction method was tried for ip-NSW too, but there were no significant improvements. It shall be noted that embodiments may include more than two rounds.

An embodiment of the graph construction methodology for IPDG, including the edge selection function, is shared in Method 1 (above). In one or more embodiments, after a graph is constructed, MIPS via a greedy search method may be performed; an example embodiment is presented in Method 2 below. A greedy search method, such as Method 2, may also be used in the graph construction for candidates collecting.

Method 2—GREEDY_SEARCH(q, G, N)

```
1:   Input: The query q, the index graph G, the size of candidate set N.
2:   Randomly choose a node with outgoing edges, say y. A ← {y}.
     Mark y as checked and the rest as unchecked ▷ In one or more embodiments, A is
     a priority queue for efficiency. Here, A is noted as a set to simplify the expression.
3:   while not all nodes in G are checked do
4:       A ← A ∪ {z ∈ S: ȳz̄ ∈ G, y ∈ A, z unchecked}.
5:       Mark nodes in A as checked.
6:       A ← top N candidates in A ∪ Z in descending order of inner product with q.
7:       if A does not update then
8:           Break.
9:       end if
10:  end while
11:  Output: A.
```

Figure 2C:
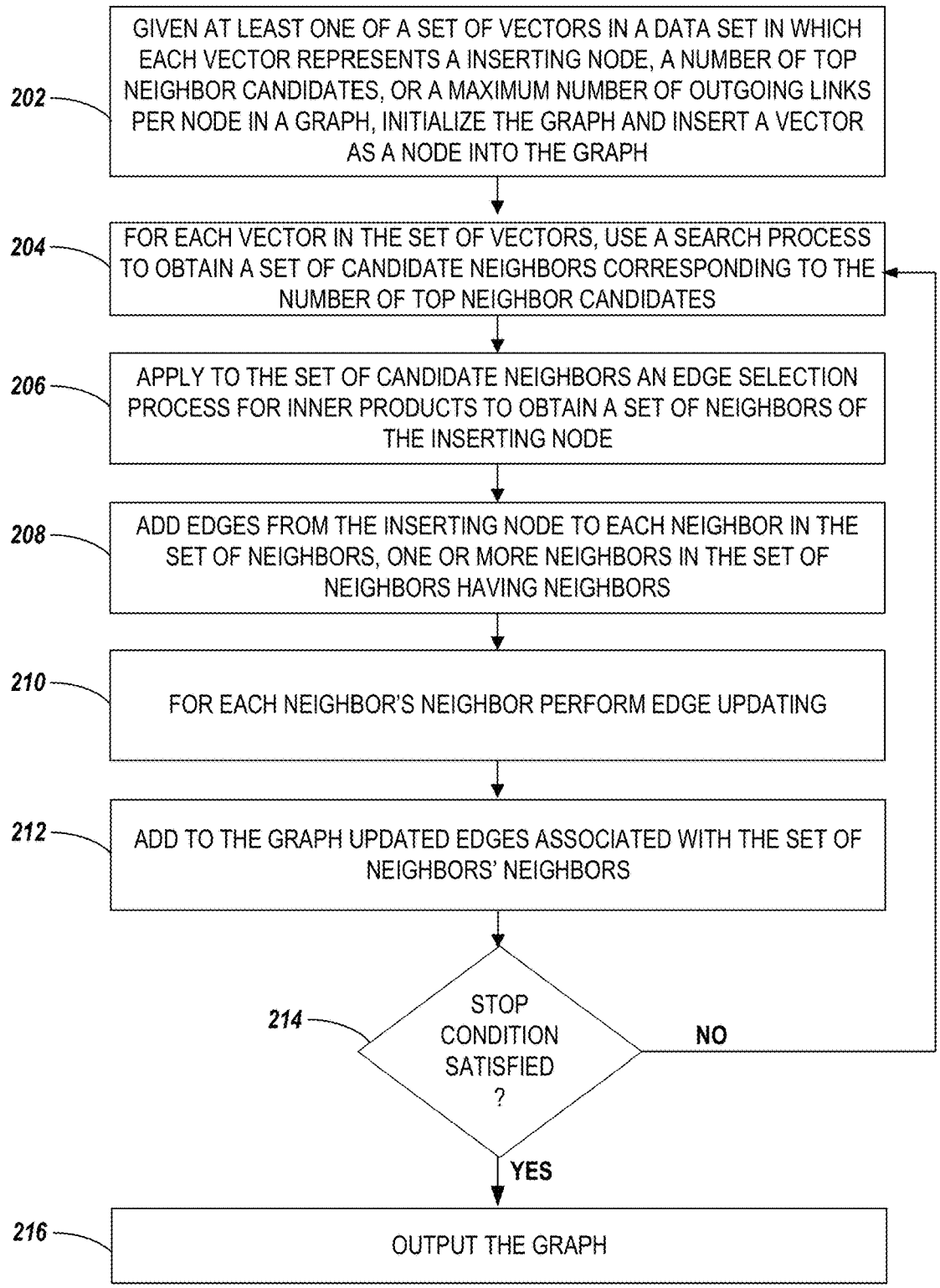
FIG. 2C depicts a flowchart for a process for constructing a graph that approximates a directed graph in an inner product space according to embodiments of the present disclosure.

FIG. 2C depicts a flowchart for a process for constructing a graph that approximates a directed graph in an inner product space according to embodiments of the present disclosure. In one or more embodiments, given a set of vectors in a dataset in which each vector represents an inserting node, a number of top neighbor candidates, and a maximum number of outgoing links per node in the graph, process 200 may begin when a directed graph is initialized (202) and a vector is inserted as a node into the graph.

For each vector in the set of vectors, a search process, e.g., a greedy search process, may be used (204) to obtain a set of candidate neighbors corresponding to the number of top neighbor candidates. An edge selection process for inner products may be applied (206) to the set of candidate neighbors to obtain a first set of neighbors of the inserting node that has less members than the set of candidate neighbors. The edges from the inserting node may be added (208) to each neighbor in the first set of neighbors, one or more neighbors in the first set of neighbors having a second set of neighbors. For each neighbor in the second set of neighbors, edge updating may be performed, e.g., according to the process shown in FIG. 2D. The updated edges associated with the second set of neighbors may be added (212) to the graph. If a stop condition, e.g., a number of rounds or repetitions, has been satisfied (214), the graph may be output (216). Otherwise, process 200 may resume with the search process (204), e.g., to repeat some of the steps for a second time, to re-construct (i.e., update) the graph before outputting (216) the graph. In one or more embodiments, the search process may comprise detecting extreme points in the dataset.

One skilled in the art shall recognize that herein: (1) certain steps may optionally be performed; (2) steps may not be limited to the specific order set forth herein; (3) certain steps may be performed in different orders; and (4) certain steps may be done concurrently.

Figure 2D:
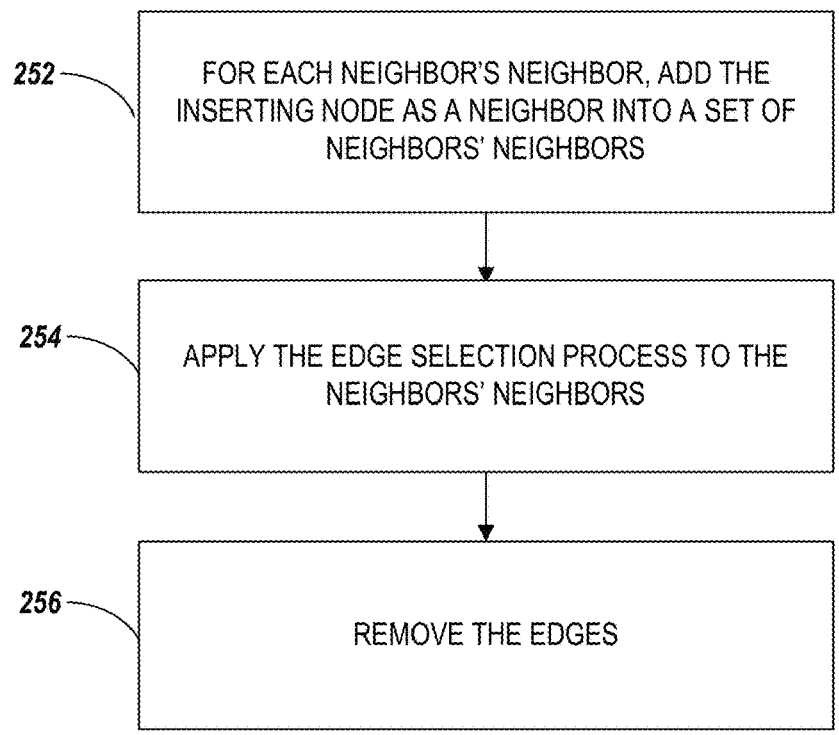
FIG. 2D depicts a flowchart for an edge updating process according to embodiments of the present disclosure.

FIG. 2D depicts a flowchart for an edge updating process according to embodiments of the present disclosure. In one or more embodiments, for each neighbor in the second set of neighbors, the inserting node may be added (252) as a neighbor into the second set of neighbors, e.g., as long as the number of top neighbor candidates has not been exceeded. The edge selection process may be applied (254) to the second set of neighbors. The original edges may be removed (256).

Figure 2E:
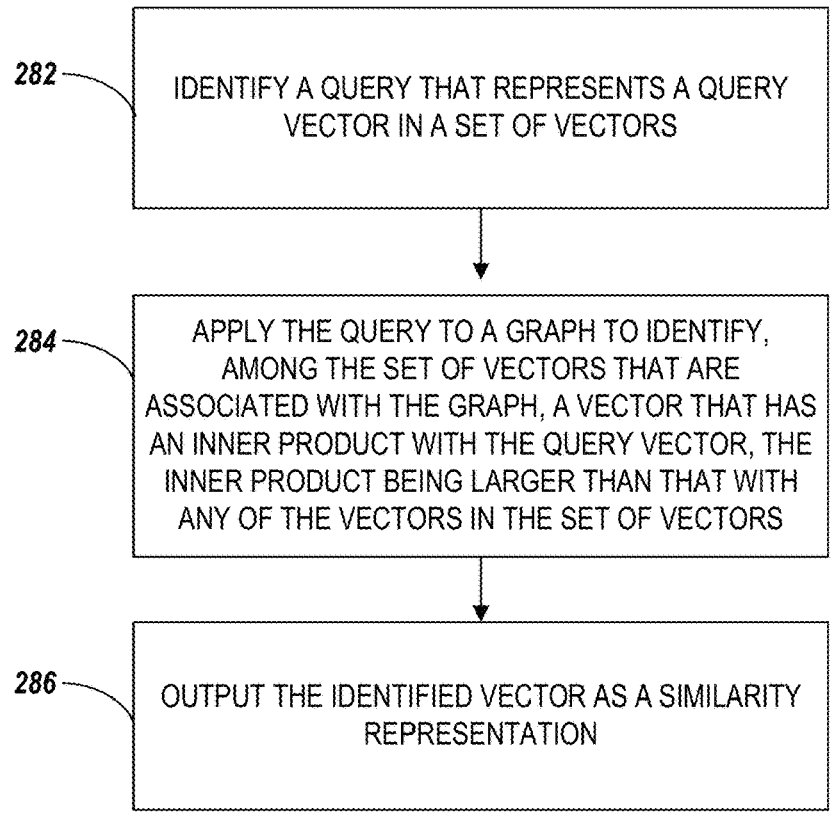
FIG. 2E depicts a flowchart for a process for performing a similarity search using a directed graph according to embodiments of the present disclosure.

FIG. 2E depicts a flowchart for a process for performing a similarity search using a directed graph according to embodiments of the present disclosure. In one or more embodiments, process 280 may begin when a query that represents a query vector in a set of vectors is identified (282). Vectors in the set of vectors may be associated with a graph that may be applied (284) to the query, e.g., to identify, among the set of vectors, a vector that has an inner product with the query vector, the inner product being larger than that with any of the vectors in the set of vectors. Once the vector has been identified, the identified vector may be output (286) as a similarity representation.

It is understood that any number of similarity representations may be generated, e.g., based on a number of desired results, and ranked according to an inner product ranking function. It is further understood that the graph may have been constructed, e.g., according to the process described with reference to FIG. 2C.

3. An Example

Figure 3A:
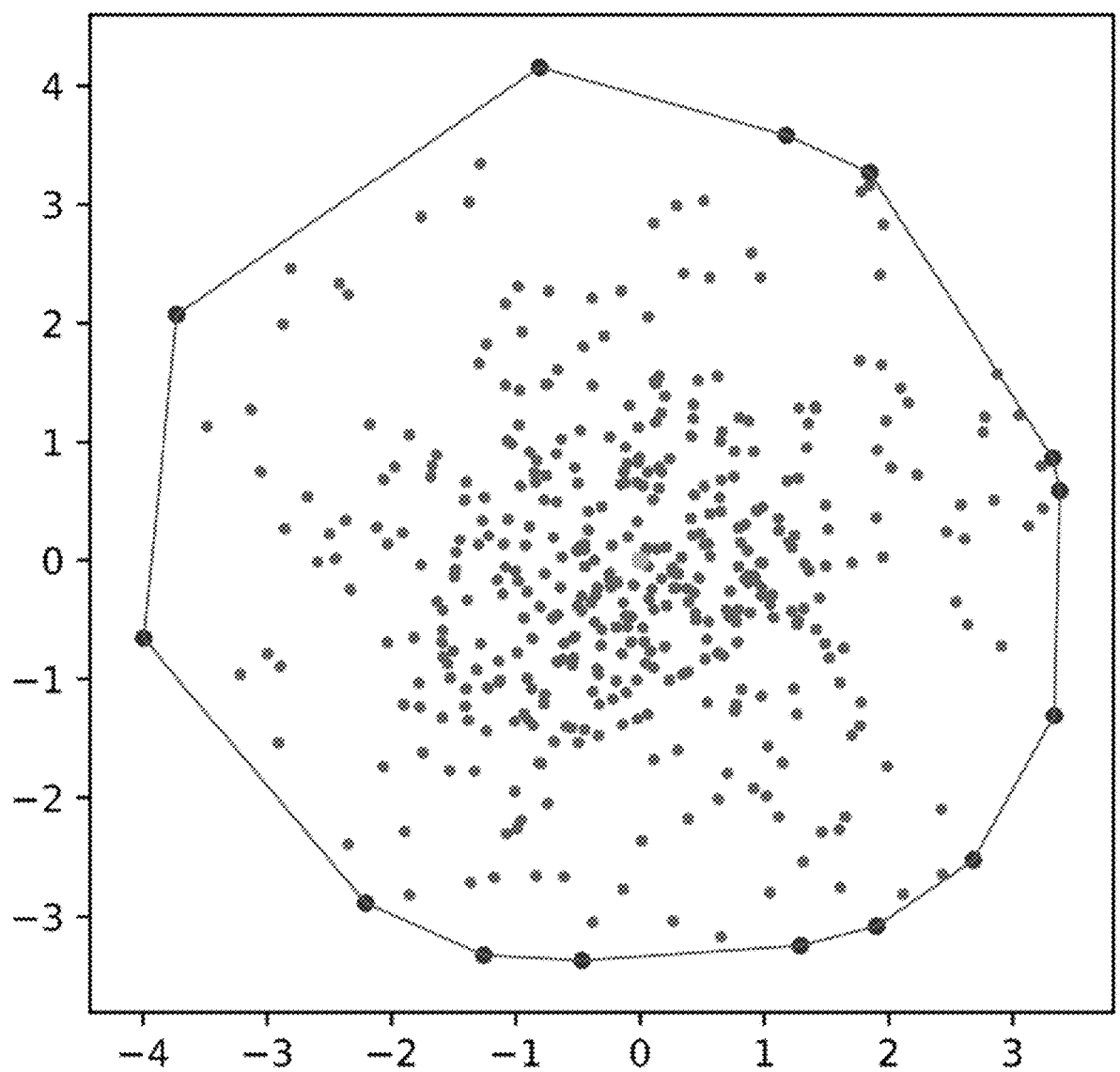
FIG. 3A depicts a true Delaunay Graph for inner product.
Figure 3B:
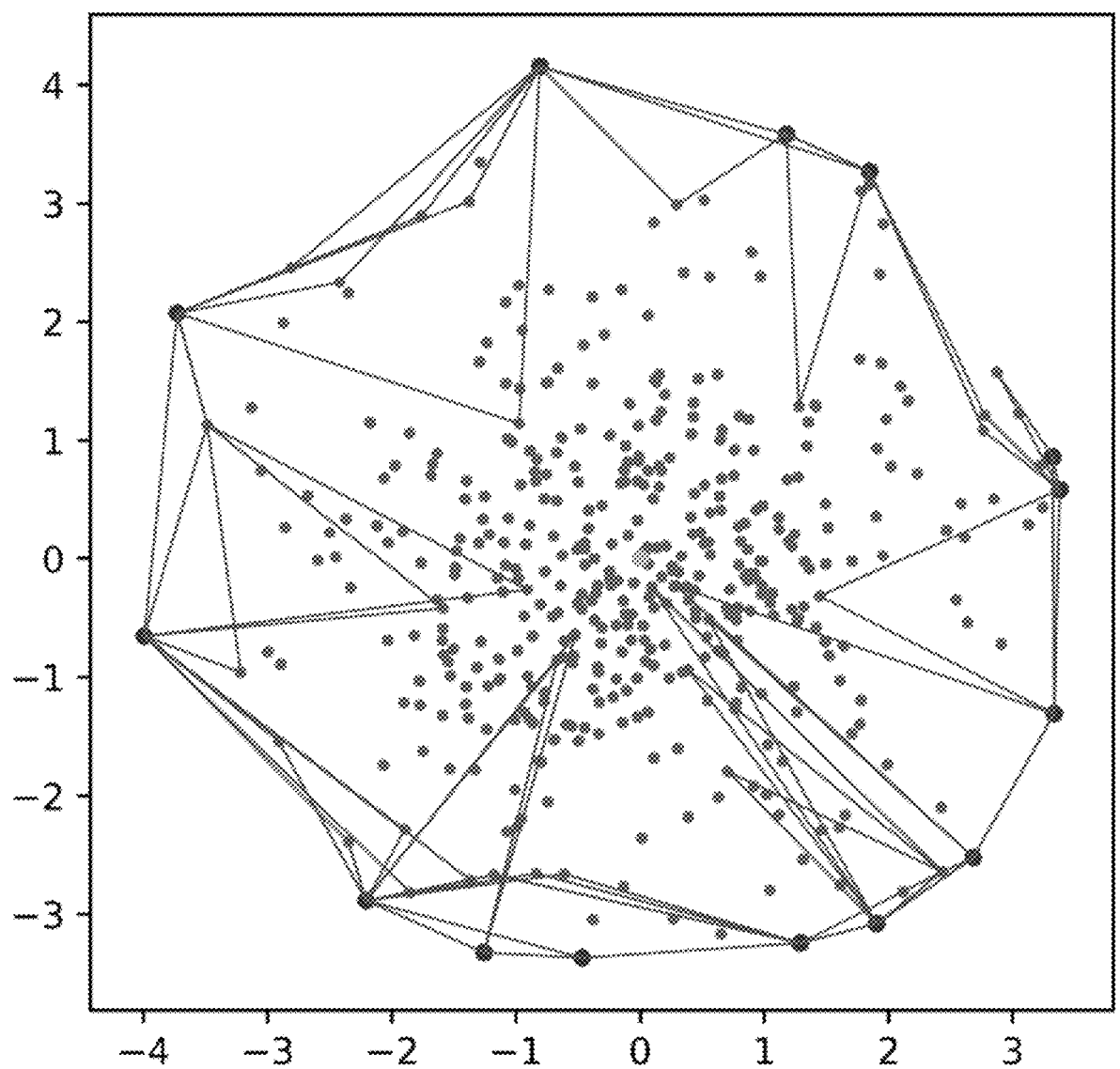
FIG. 3B depicts results of a toy example for approximate inner product Delaunay Graph construction. Graph 305 is built according to IPDG embodiments of the present disclosure.
Figure 3C:
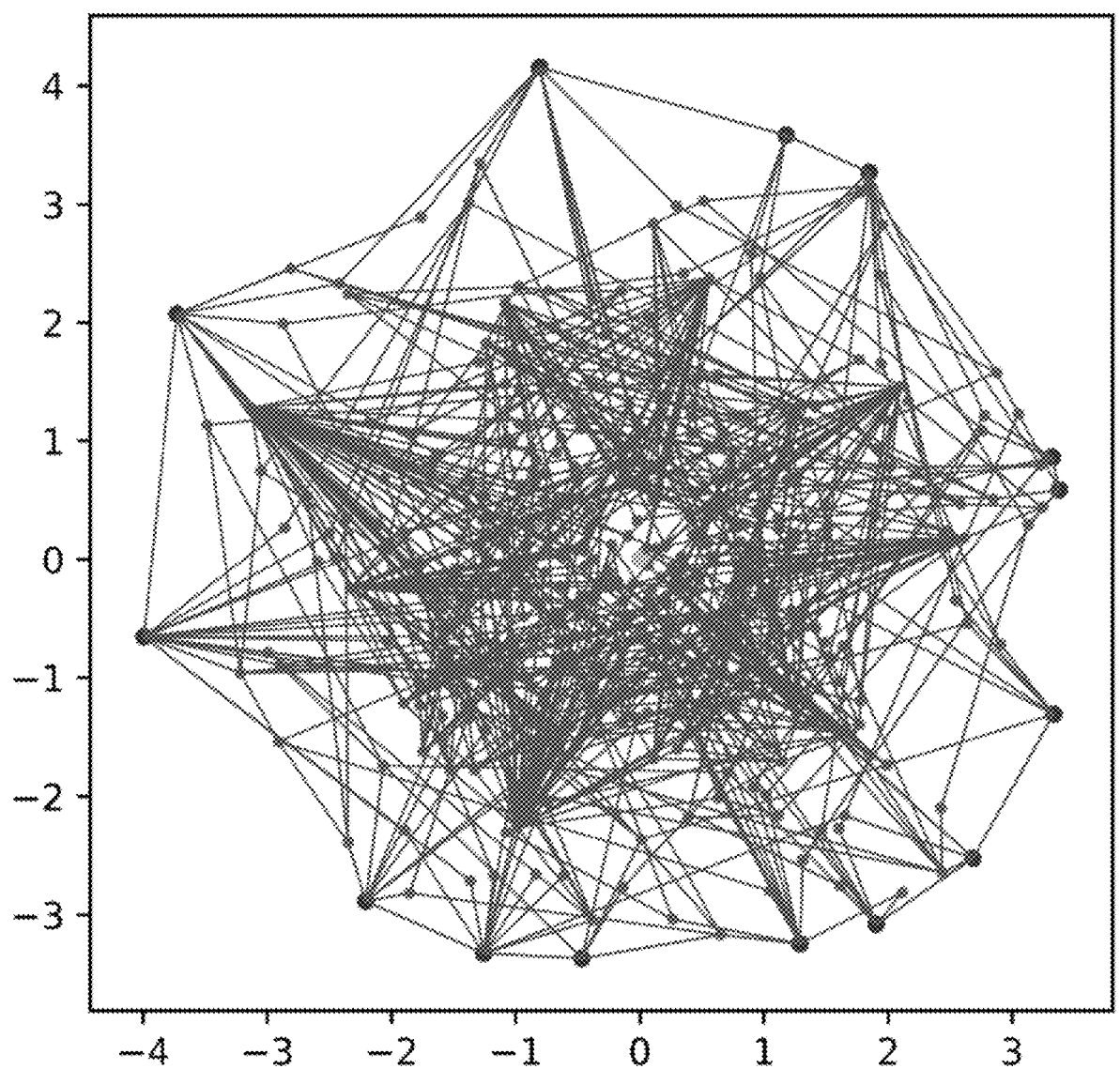
FIG. 3C is built by ip-NSW.
Figure 4A:
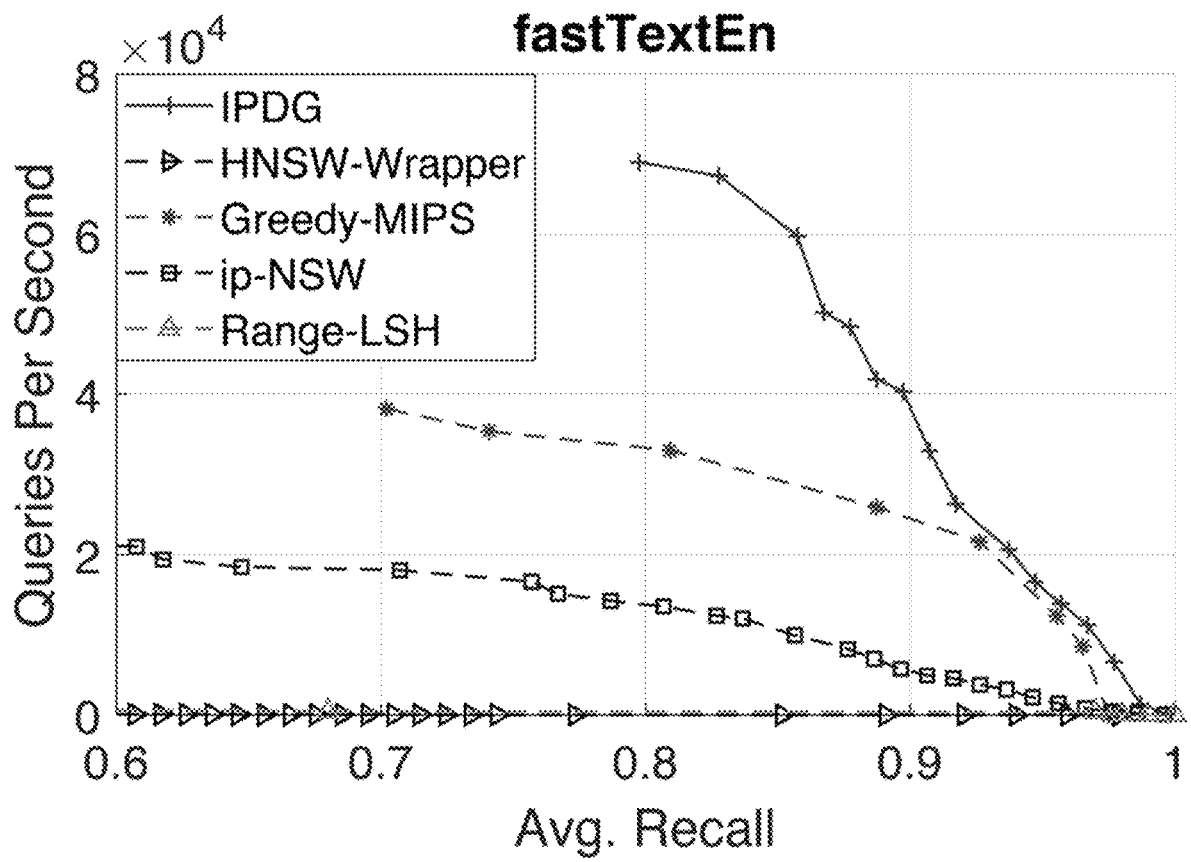
FIG. 4A-FIG. 4F depict Recall vs. Time curves of for all methods in top-1 MIPS.
Figure 4B:
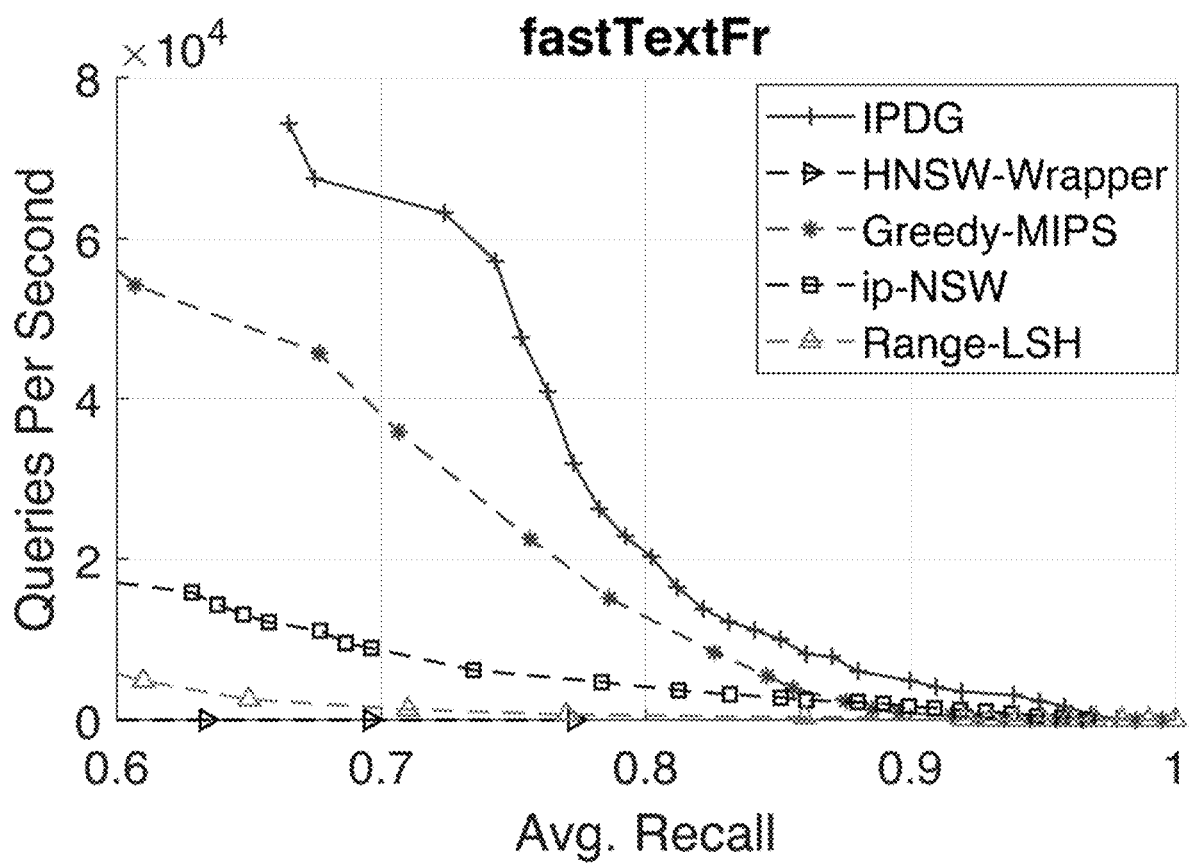
Figure 4C:
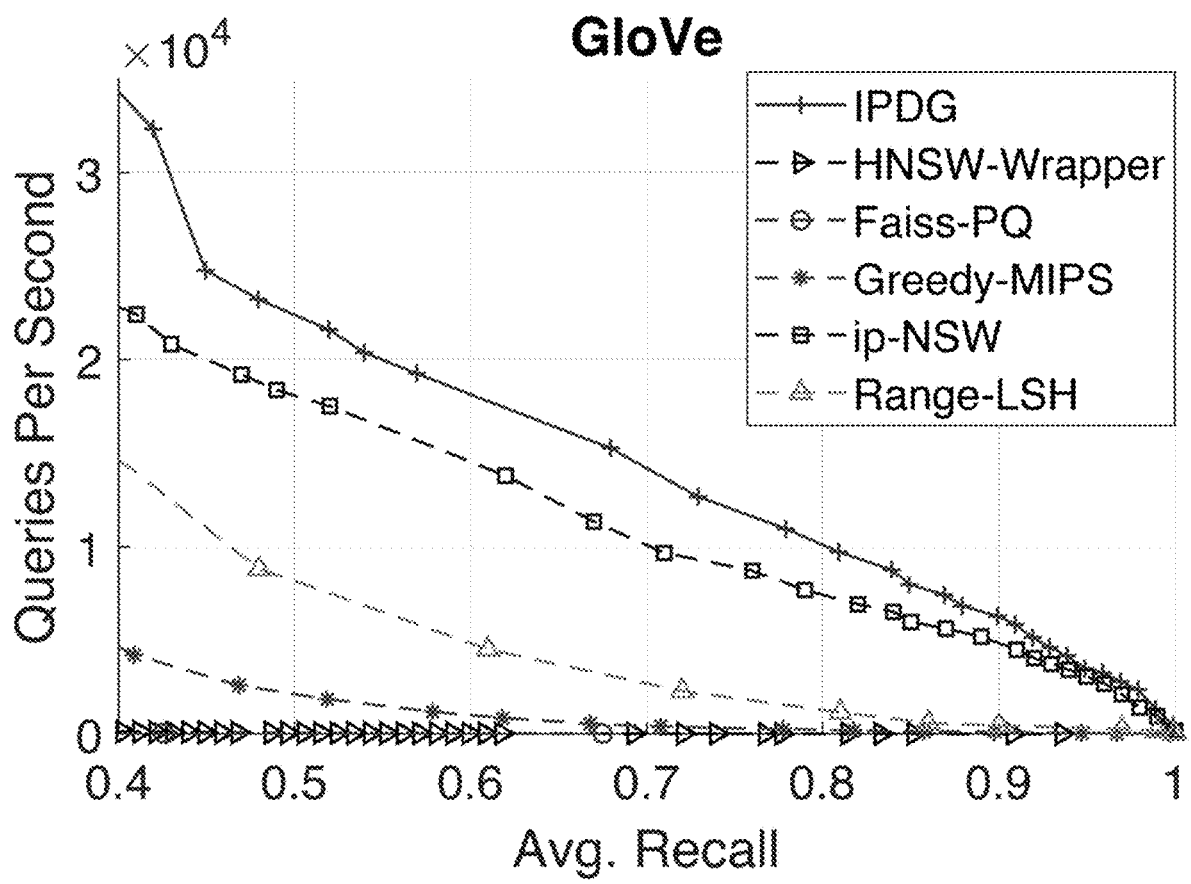
Figure 4D:
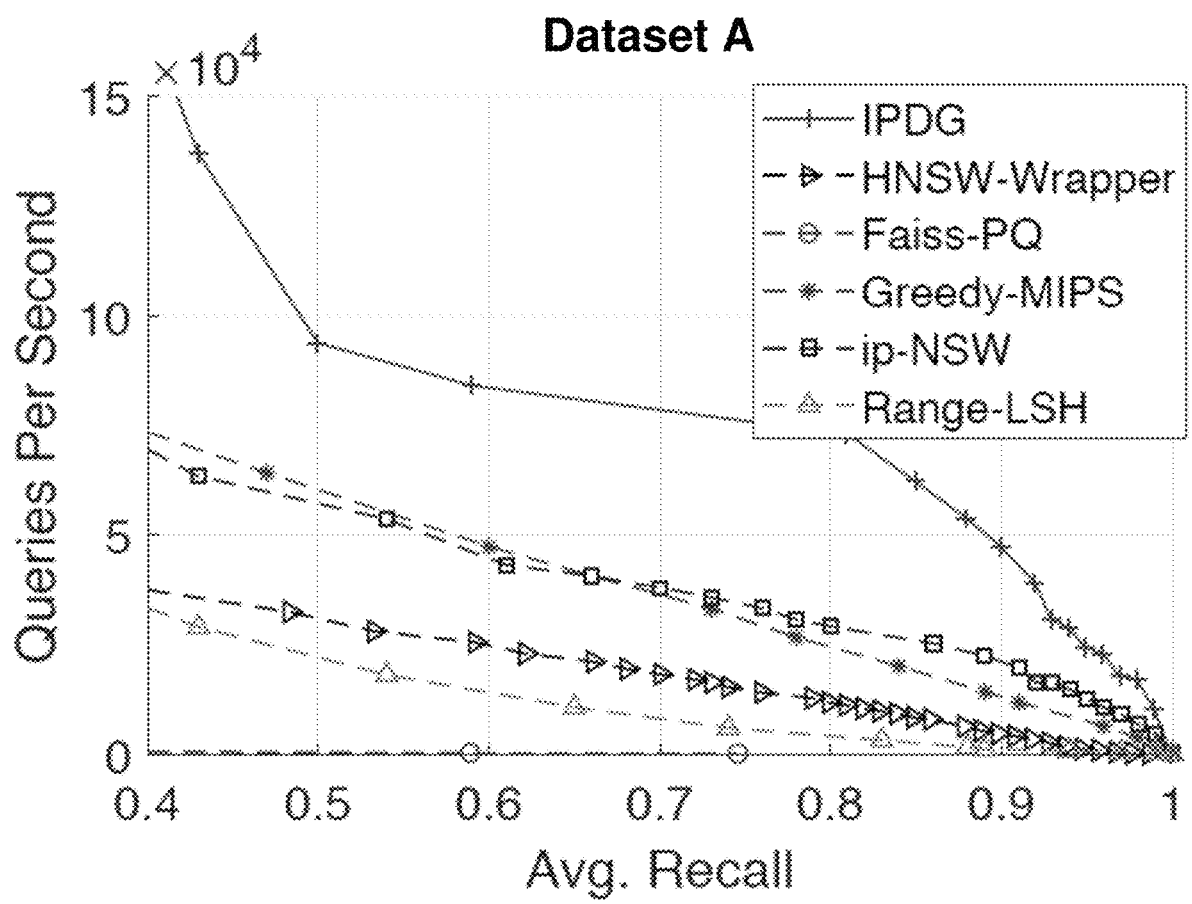
Figure 4E:
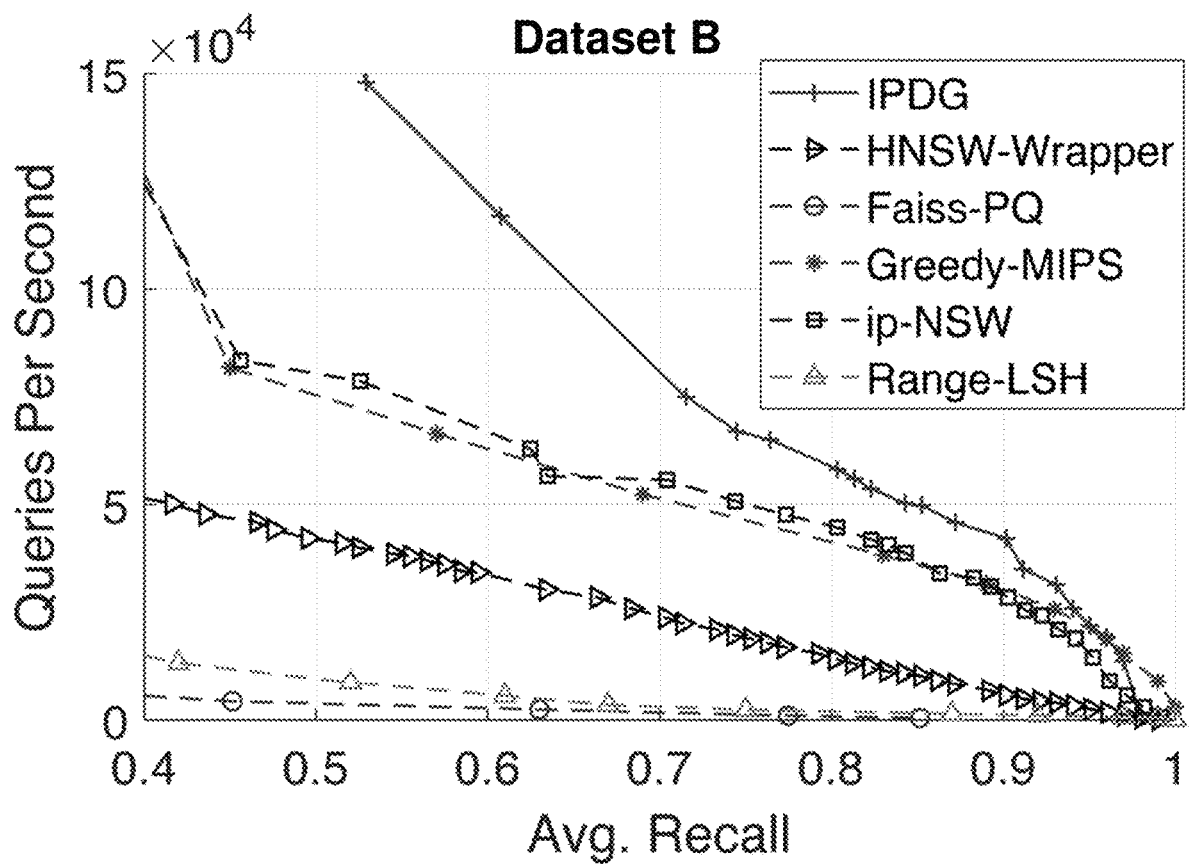
Figure 4F:
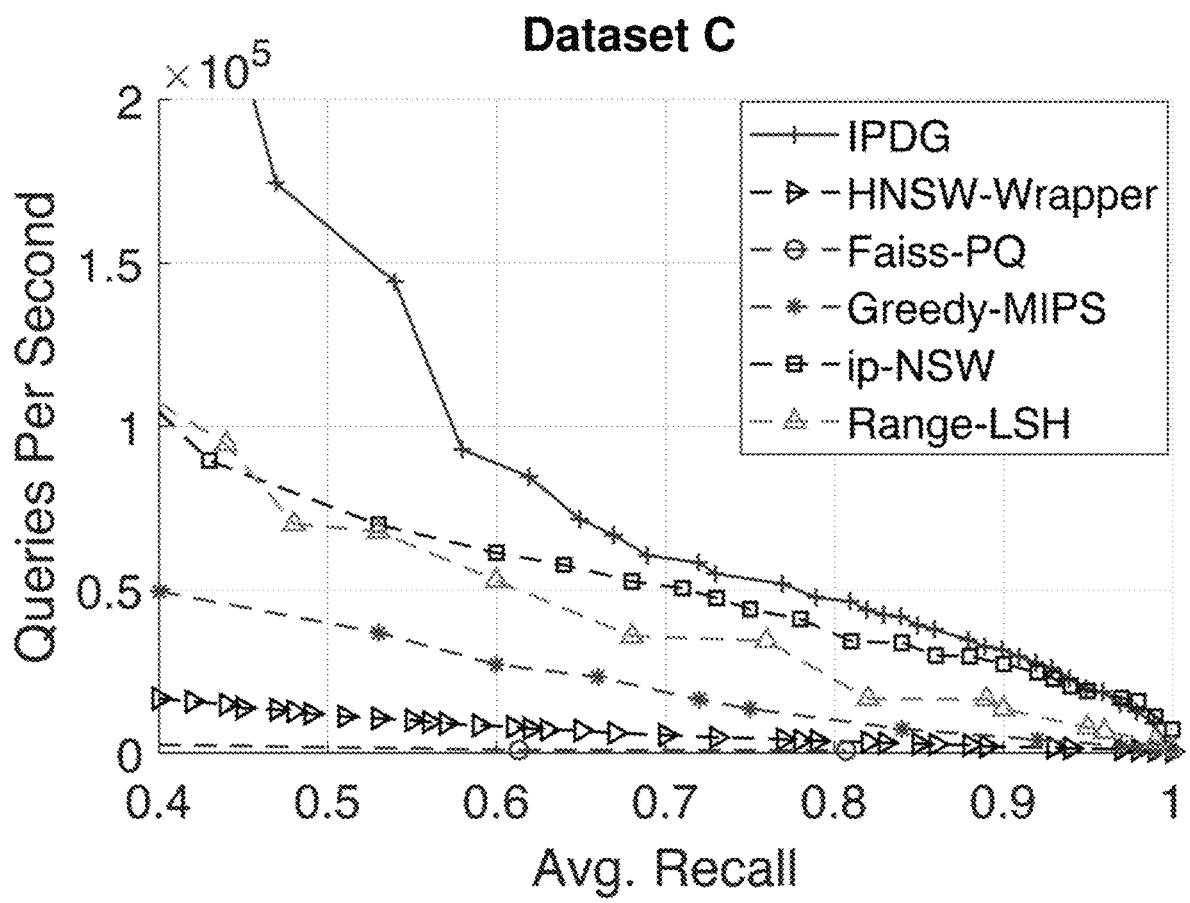

To further explain the differences between embodiments of the methods proposed herein and previous state-of-the-art, ip-NSW, a case study was conducted on a toy example data, which is shown in FIGS. 3A-C. Four hundred (400) two-dimensional vectors were randomly generated with the following distribution Normal(0, $I_2$). FIG. 3A shows true Delaunay Graph 300 for inner product. The larger, dark nodes correspond to extreme points of this dataset. FIG. 3B depicts graph 305 that is built by an IPDG embodiment. Lines represent edges and the larger (darker) exterior dots represent extreme points. Graph 310 in FIG. 3C is built by ip-NSW. It is noted that IPDG and ip-NSW construct directed edges instead of undirected ones for the efficiency consideration. Only edges for nodes with incoming edges are shown in FIG. 3B and FIG. 3C. The parameter N was set to 10, and M was set to 2 for both methods in this study. Note that graphs built by IPDG and ip-NSW are directed graphs. To help unclutter the figures, only edges corresponding to nodes with incoming edges were kept and other edges were ignored. In one or more embodiments, nodes without incoming edges will not be visited and do not affect the searching process, thus, they can be removed after the graph construction. As can be seen, the graph built by the IPDG embodiment is more like the true Delaunay Graph 300 and is more efficient for MIPS, while the graph built by ip-NSW has too many useless edges as shown in FIG. 3C.

D. Experiments

In this section, an IPDG embodiment is evaluated by comparing it with state-of-the-art MIPS methods. It shall be noted that these experiments and results are provided by way of illustration and were performed under specific conditions using a specific embodiment or embodiments; accordingly, neither these experiments nor their results shall be used to limit the scope of the disclosure of the current patent document.

1. Datasets

The following three pre-trained embeddings were used to investigate the performance of IPDG in MIPS for similar word searching. For each word embedding datasets, 10000 vectors were randomly selected as queries and others as the base data.

fastTextEn and fastTextFr are 300-dimensional English and French word embeddings trained on Wikipedia using fastText (Armand Joulin, Edouard Grave, Piotr Bojanowski, Matthijs Douze, Hérve Jégou, and Tomas Mikolov. 2016. Fasttext.zip: Compressing text classification models. arXiv preprint arXiv:1612.03651).

GloVe50 are 50-dimensional word embeddings trained on Wikipedia2014 and Gigaword5 using GloVe.

As most state-of-the-art MIPS methods evaluate their performance on datasets, the IPDG embodiment was also benchmarked on three datasets: Dataset A, Dataset B, and Dataset C. The Matrix Factorization (MF) method in Hu et al. (Yifan Hu, Yehuda Koren, and Chris Volinsky, "Collaborative filtering for implicit feedback datasets," in *Proceedings of the Eighth IEEE International Conference on Data Mining (ICDM)*, pages 263-272 (2008)) was used to obtain latent vectors of user and item. Then, in the retrieval process, user vectors were regarded as queries and the item vector that had the highest inner product score with each query should be returned by the MIPS method.

TABLE 1

Statistics of the datasets

| Datasets | Dimension | # Base Data |
|---|---|---|
| fastTextEn | 300 | 989873 |
| fastTextFr | 300 | 1142501 |
| GloVe | 50 | 1183514 |
| Dataset A | 64 | 104708 |
| Dataset B | 64 | 25815 |
| Dataset C | 50 | 17770 |

Statistics of the six datasets are listed in Table 1. They vary in dimension (300, 64, and 50), sources (recommendation ratings, word documents), and extraction methods (fastText, GloVe, and MF), which is sufficient for fair comparison. The ground truth is the top-1 nearest neighbor by inner product.

2. Baselines

In this patent document, an IPDG embodiment is compared with state-of-the-art MIPS methods. First, reduction methods can be baselines. Some popular ANNS open source platforms utilize the reduction trick to solve MIPS, such as Annoy. As introduced in Section B.2, with reductions, any ANNS methods may be applied for MIPS. In this line, HNSW (Yury A. Malkov and Dmitry A. Yashunin, "Efficient And Robust Approximate Nearest Neighbor Search Using Hierarchical Navigable Small World Graphs," in *IEEE Transactions On Pattern Analysis and Machine Intelligence* (2018)) (referred to as HNSW-Wrapper) is chosen as the baseline and other alternatives are neglected since HNSW is usually regarded as the most promising method for ANNS in metric spaces. The original implementation of HNSW was exploited and the wrapper introduced in Section B.2 was added.

Range-LSH (Xiao Yan, Jinfeng Li, Xinyan Dai, Hongzhi Chen, and James Cheng, "Norm-ranging LSH for Maximum Inner Product Search," in Advances in Neural Information Processing Systems (NeurIPS), pages 2952-2961 (2018), Montreal, Canada) is also a reduction MIPS method and considers norm distribution of the data. The original implementation was used.

Faiss-PQ (github.com/facebookresearch/faiss) is a popular open source ANNS platform from Facebook, which is mainly implemented by Product Quantization (PQ) techniques. It contains MIPS as one component.

Greedy-MIPS is an MIPS method from Yu et al. (Hsiang-Fu Yu, Cho-Jui Hsieh, Qi Lei, and Inderjit S. Dhillon, "A greedy approach for budgeted maximum inner product search," In *Advances in Neural Information Processing Systems (NIPS)*, pages 5453-62 (2017), Long Beach, CA). The original implementation (github.com/rofuyu/expgmips-nips17) was used.

ip-NSW is a state-of-the-art MIPS method (github.com/stanis-morozov/ip-nsw) proposed in Morozov and Babenko (2018), which was referenced above.

3. Experimental Settings

There are two popular ways to evaluate ANNS/MIPS methods: (i) Recall vs. Time; (ii) Recall vs. Computations. Recall vs. Time reports the number of queries a method can process per second at each recall level. Recall vs. Computations reports the amount/percentage of pairwise distance/similarity computations that the ANNS/MIPS method costs at each recall level. Both evaluation indicators have their own pros and cons. Recall vs. Time is straightforward, but it may introduce bias in implementation. Recall vs. Computations is beyond implementation, but it does not consider the cost of different index structures. Both of these perspectives will be shown in the following experiments for the comprehensive evaluation.

All comparing methods have tunable parameters. In order to present a fair comparison, all parameters are varied over a fine grid for all methods. For each method in each experiment, there will be multiple points scattered on the plane. To plot curves, the best result, $max_x$, is found and plotted along with the x-axis (i.e., Recall). Then, 100 buckets are produced by evenly splitting the range from 0 to $max_x$. For each bucket, the best result along the y-axis (e.g., the biggest amount of queries per second or the lowest percentage of computations) was chosen. If there were no data points in the bucket, the bucket was ignored. In this way, there should be multiple pairs of data for drawing curves. All time-related experiments were performed on a 2× 3.00 GHz 8-core i7-5960X central processing unit (CPU) server with 32 GB memory.

4. Experimental Results

Experimental results for all comparison methods are shown from the view of Recall vs. Time, which are shown in FIG. 4A through FIG. 4F. Best results are in upper right corners. Overall, the test IPDG embodiment performs consistently and significantly better than baselines on all six datasets. As can be seen, some baselines show promising performance on partial datasets but they may work much worse on other datasets. For example, on lower-dimensional datasets (i.e., the FIG. 4C-FIG. 4F), ip-NSW worked well, but it failed on high-dimensional datasets (i.e., fastTextEn and fastTextFr). Greedy-MIPS showed advantages on high-dimensional datasets but did worse on some lower-dimensional datasets, such as Dataset 3 and GloVe. Among all methods, only the IPDG embodiment worked consistently well on all datasets, which shows its effectiveness and robustness. Range-LSH performed badly in these experiments. A major reason is that Range-LSH does not have a good "budget" setting, similar to the budget in Greedy-MIPS and the $N_{search}$ parameter in graph-based methods. HNSW-Wrapper did not work comparably with the IPDG embodiment either, especially on word embedding datasets. On some recall levels, say higher than 0.5, searching by HNSW-Wrapper was extremely slow (see FIG. 4A-FIG. 4C). It is clear that HNSW-Wrapper is far from state-of-the-art in challenging MIPS tasks, such as larger or higher-dimensional vector datasets. The PQ-based method, Faiss-PQ, worked poorly on all datasets since quantization codes can speed-up the retrieval while may largely reduce the search performance, especially for the challenging top-1 MIPS problem. Note that results for Faiss-PQ on fastTextEn and fastTextFr are not shown in FIG. 4A-FIG. 4F since they cannot produce recalls greater than 0.6.

Figure 5A:
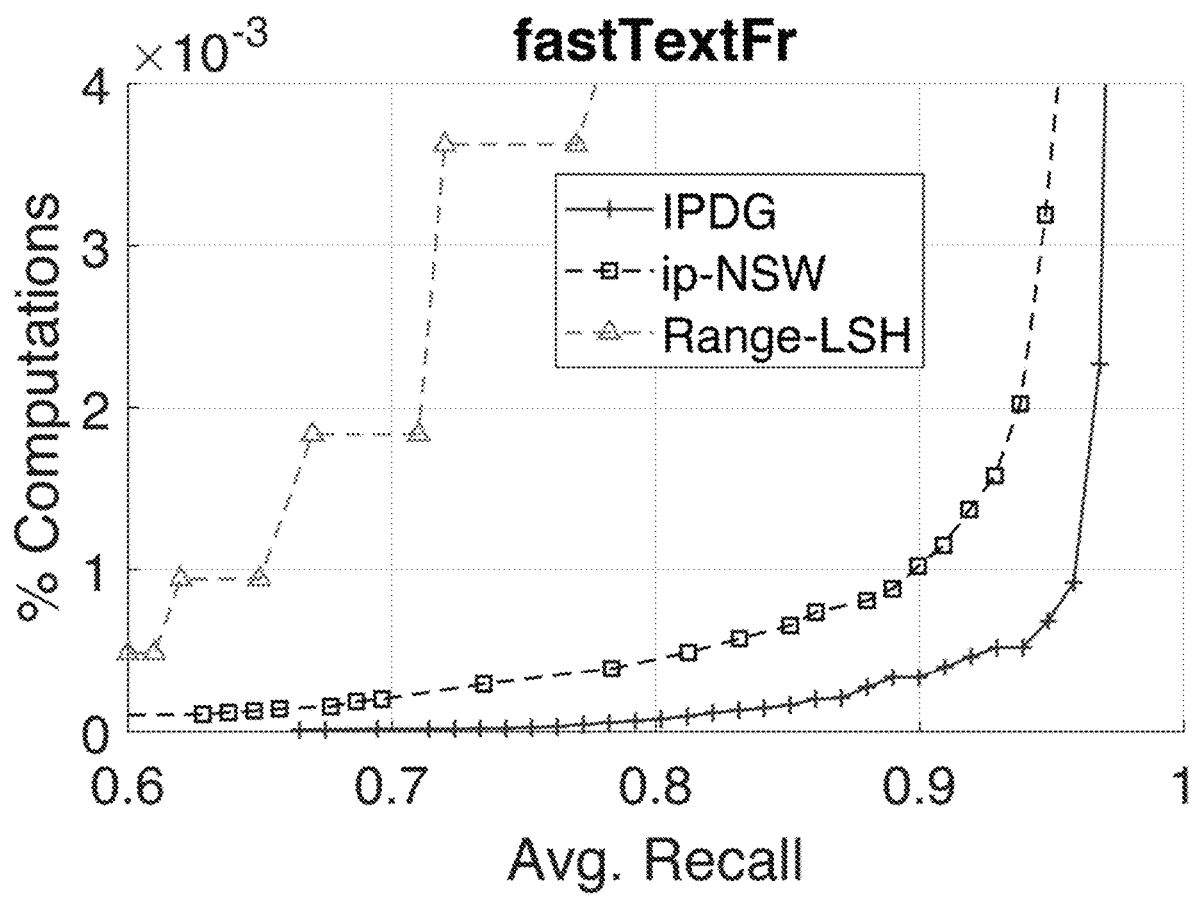
FIG. 5A-FIG. 5C depict Recall vs. Computations curves in top-1 MIPS.
Figure 5B:
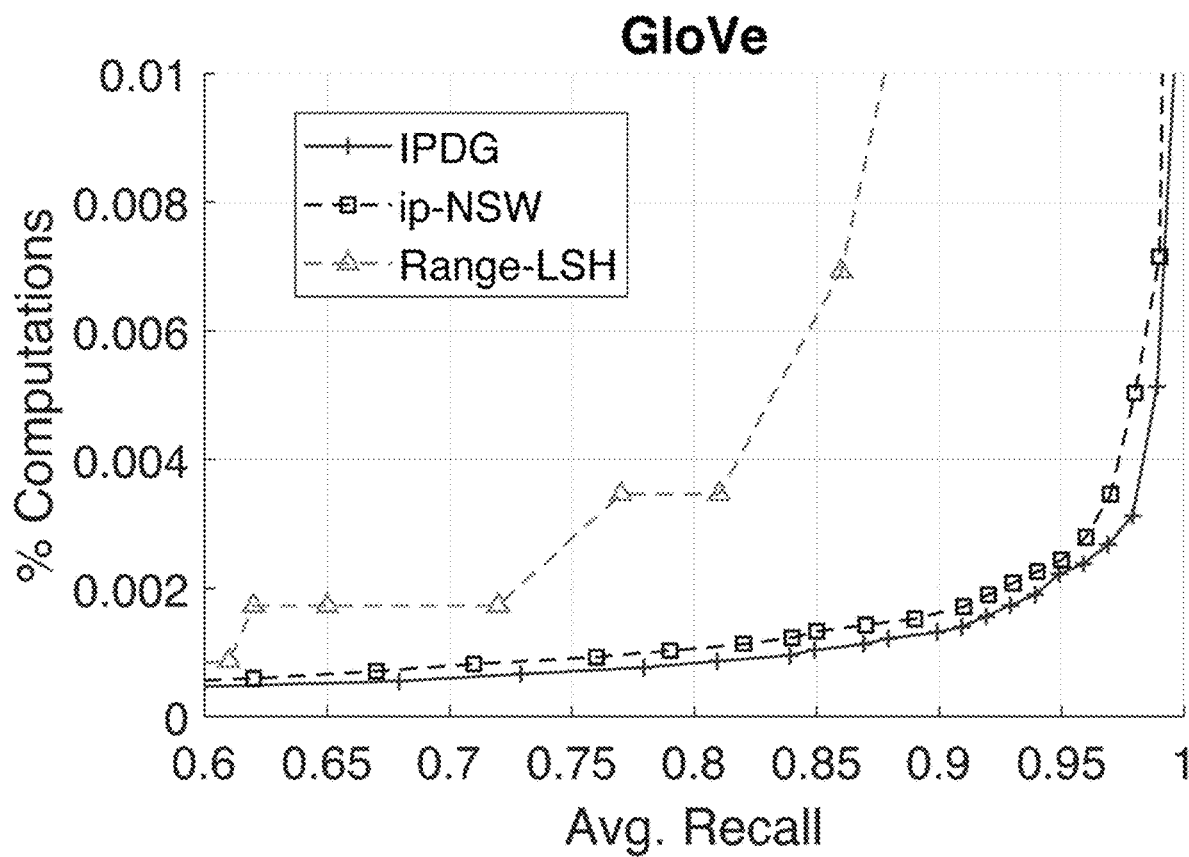
Figure 5C:
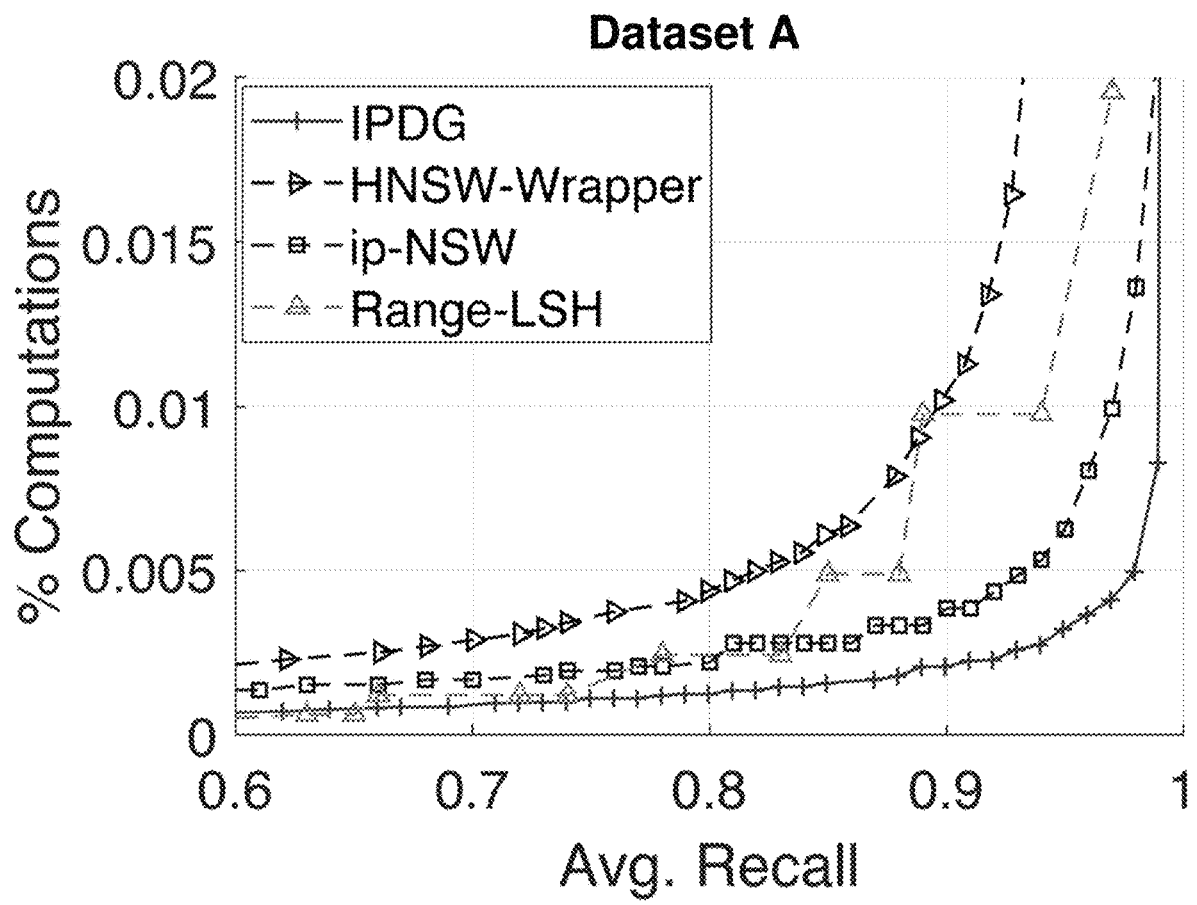

Experimental results by Recall vs. Computations are shown in FIG. 5A through FIG. 5C. It is noted results for HNSW-Wrapper on fastTextFr and Glove are not shown. Best results are in shown in the lower right corners. Greedy-MIPS and Faiss-PQ cannot be evaluated from this view and the other four methods were explored here. Due to limited space, only results on partial datasets are represented. As can be seen, only the IPDG embodiment and ip-NSW worked consistently well on all shown datasets. HNSW-Wrapper and Range-LSH worked comparably with the other two methods on the recommendation dataset, Dataset A, while performed much worse on the word embedding dataset, fastTextFr and GloVe. It is even unable to show the result for HNSW-Wrapper on fastTextFr and Glove in the showing scope. For the IPDG embodiment and ip-NSW, they share similar index structures, it is fair to compare their computation amount for each query. To get a similar recall, the IPDG embodiment required much less inner product computation. For example, on fastTextFr, to reach the recall at 95%, ip-NSW required about 0.3% computations while the IPDG embodiment only needed 0.07% computations. This also demonstrates the efficiency of vector inner product retrieval by IPDG.

5. More Comparisons with ip-NSW

TABLE 2

Number and percentage of nodes with incoming edges for graphs built ip-NSW and the tested IPDG embodiment

| Datasets | ip-NSW | | IPDG Embodiment | |
|---|---|---|---|---|
| fastTextEn | 144339 | (14.6%) | 100138 | (10.1%) |
| fastTextFr | 378875 | (33.2%) | 250750 | (21.9%) |
| GloVe | 622080 | (52.6%) | 437378 | (37.0%) |
| Dataset A | 32434 | (31.0%) | 12985 | (12.4%) |
| Dataset B | 5224 | (20.2%) | 1871 | (7.2%) |
| Dataset C | 17154 | (96.5%) | 14867 | (83.7%) |

In this section, a study was conducted by comparing an IPDG embodiment and its related method, ip-NSW, on the index graph quality. The evaluation measure is the number of nodes with incoming edges. Intuitively, only extreme points of each dataset are useful for top-1 MIPS retrieval. Non-extreme points could be ignored in graph construction (i.e., without incoming edges so will not be visited in searching). Results for N=100 and M=16 are shown in Table 2. As can be seen, the graphs built by the IPDG embodiment have much fewer nodes with incoming edges, which is consistent with the toy example introduced above. One reason for this is explained below. The finely designed edge selection method in the IPDG embodiment tends to select extreme points as outgoing neighbors for each newly inserted node or each edge updating node (see Method 1, lines 9-13). Meanwhile, extreme points will have more opportunities to keep incoming edges in the edge updating and the second-round graph construction. While non-extreme points will lose their incoming edges in these processes.

E. Some Conclusions

Fast similarity search for data representations via inner product is a crucial and challenging task since it is one of the basic operations in machine learning methods and recommendation methods. To remedy this issue, embodiments of a search on graph methodology, which may be referred generally for convenience as IPDG, are presented herein for MIPS in embedded latent vectors. IPDG embodiments provide a better approximation to Delaunay Graphs for inner product than previous methods and are more efficient for the MIPS task. Experiments on extensive benchmarks demonstrate that IPDG embodiments outperform previous state-of-the-art MIPS methods in retrieving latent vectors under inner product.

In this patent document, we improve the top-1 MIPS performance by graph-based index. It shall be noted that implementations may be adapted to move the state-of-the-art frontier further, not only for top-1 MIPS but also for top-n, n>1, MIPS results. Besides metric measures (e.g., $l_2$-distance and cosine similarity) and inner product, more complicated measures may be adopted in natural language processing tasks. Also, embodiments may adopt a GPU-based system for fast ANNS or MIPS, which has been shown highly effective for generic ANNS tasks.

F. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a CPU or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

Figure 6:
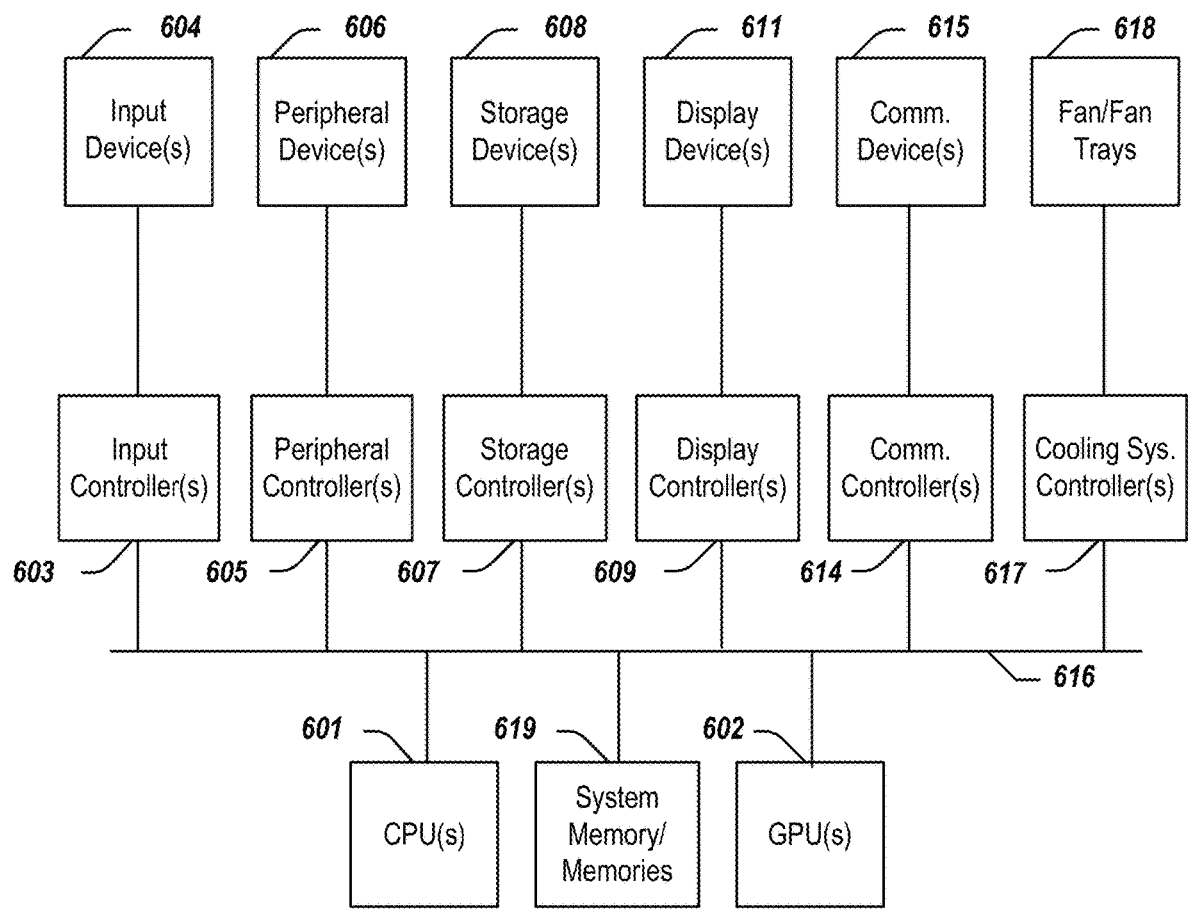
FIG. 6 depicts a simplified block diagram of a computing device/information handling system, in accordance with embodiments of the present disclosure.

FIG. 6 depicts a simplified block diagram of a computing device/information handling system (or computing system) according to embodiments of the present disclosure. It will be understood that the functionalities shown for system 600 may operate to support various embodiments of a computing system—although it shall be understood that a computing system may be differently configured and include different components, including having fewer or more components as depicted in FIG. 6.

As illustrated in FIG. 6, the computing system 600 includes one or more CPUs 601 that provides computing resources and controls the computer. CPU 601 may be implemented with a microprocessor or the like, and may also include one or more graphics processing units (GPU) 602 and/or a floating-point coprocessor for mathematical computations. In one or more embodiments, one or more GPUs 602 may be incorporated within the display controller 609, such as part of a graphics card or cards. The system 600 may also include a system memory 619, which may comprise RAM, ROM, or both.

A number of controllers and peripheral devices may also be provided, as shown in FIG. 6. An input controller 603 represents an interface to various input device(s) 604, such as a keyboard, mouse, touchscreen, and/or stylus. The computing system 600 may also include a storage controller 607 for interfacing with one or more storage devices 608 each of which includes a storage medium such as magnetic tape or disk, or an optical medium that might be used to record programs of instructions for operating systems, utilities, and applications, which may include embodiments of programs that implement various aspects of the present disclosure. Storage device(s) 608 may also be used to store processed data or data to be processed in accordance with the disclosure. The system 600 may also include a display controller 609 for providing an interface to a display device 611, which may be a cathode ray tube (CRT) display, a thin film transistor (TFT) display, organic light-emitting diode, electroluminescent panel, plasma panel, or any other type of display. The computing system 600 may also include one or more peripheral controllers or interfaces 605 for one or more peripherals 606. Examples of peripherals may include one or more printers, scanners, input devices, output devices, sensors, and the like. A communications controller 614 may interface with one or more communication devices 615, which enables the system 600 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 600 comprises one or more fans or fan trays 618 and a cooling subsystem controller or controllers 617 that monitors thermal temperature(s) of the system 600 (or components thereof) and operates the fans/fan trays 618 to help regulate the temperature.

In the illustrated system, all major system components may connect to a bus 616, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact disc (CD) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using application specific integrated circuits (ASICs), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as a CD and holographic devices; magneto-optical media; and hardware devices that are specially configured to store or to store and execute program code, such as ASICs, PLDs, flash memory devices, other NVM devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method for constructing a graph, comprising:
   given a set of data nodes, initializing the graph;
   for each data node in the set of data nodes, performing steps comprising:
      inserting the data node into the graph as an inserting node;
      using a search process to obtain a set of candidate neighbors in the graph for the inserting node;
      applying to the set of candidate neighbors an edge selection process, which uses a selection criterion comprising whether a candidate neighbor in the set of candidate neighbors has an inner product with itself that is greater than inner products of the candidate neighbor with each neighbor in a set of neighbors, to obtain a set of neighbors of the inserting node; and
      updating edges in the graph; and
   outputting the graph.

2. The processor-implemented method of claim 1 further comprising performing the following steps as a second round for each data node in the set of data nodes before outputting the graph:
   using the search process to obtain a set of candidate neighbors in the graph for the inserting node;
   applying to the set of candidate neighbors an edge selection process, which uses the selection criterion comprising whether a candidate neighbor in the set of candidate neighbors has an inner product with itself that is greater than inner products of the candidate neighbor with each neighbor in a set of neighbors, to obtain a set of neighbors of the inserting node; and
   updating edges in the graph.

3. The processor-implemented method of claim 1 wherein the step of updating edges in the graph comprises:
   for each neighbor in the set of neighbors, adding an edge between the inserting node and the neighbor; and
   for each neighbor in the set of neighbors:
      defining a set of edge nodes comprising data nodes that are linked in the graph via an edge to the neighbor;
      using the edge selection process on the set of edge nodes to obtain a set of updated edge nodes;
      for any edge node in the set of edge nodes that is not in the set of updated edge nodes, removing the edge in the graph between the edge node and the neighbor; and
      for any edge node in the set of updated edge nodes that was not in the set of edge nodes, adding an edge in the graph between the edge node and the neighbor.

4. The processor-implemented method of claim 2 further comprising, after outputting the graph, using the graph in a search process.

5. The processor-implemented method of claim 4 wherein the step of using the graph in a search process comprises, given a query, using the graph to identify one or more data nodes that are relevant to the query.

6. The processor-implemented method of claim 3 wherein the set of edge nodes comprises the inserting node.

7. The processor-implemented method of claim 1 wherein the search process is a greedy search process.

8. A processor-implemented method for performing a search using a graph, comprising:
   applying a search method using a query and the graph to identify, among a set of vectors that are associated with the graph, a set of one or more results vectors; and
   outputting the set of one or more results vectors,
   wherein the graph has been generated by steps comprising:
      for each vector in the set of vectors, performing steps comprising:
         inserting the vector into the graph as an inserting node;
         using a search process to obtain a set of candidate neighbors in the graph for the inserting node;
         applying to the set of candidate neighbors an edge selection process, which uses a selection criterion comprising whether a candidate neighbor in the set of candidate neighbors has an inner product with itself that is greater than inner products of the candidate neighbor with each neighbor in a set of neighbors, to obtain a set of neighbors of the inserting node; and
         updating edges in the graph; and
      outputting the graph.

9. The processor-implemented method of claim 8 further comprising performing the following steps as a second round for each vector in the set of vectors before outputting the graph:
   inserting the vector into the graph as an inserting node;
   using a search process to obtain a set of candidate neighbors in the graph for the inserting node;
   applying to the set of candidate neighbors an edge selection process, which uses a selection criterion comprising whether a candidate neighbor in the set of candidate neighbors has an inner product with itself that is greater than inner products of the candidate neighbor with each neighbor in a set of neighbors, to obtain a set of neighbors of the inserting node; and
   updating edges in the graph.

10. The processor-implemented method of claim 8 wherein the search method using the graph comprises using an inner product ranking to identify the set of one or more results vectors.

11. The processor-implemented method of claim 8 wherein the step of updating edges in the graph comprises:
    for each neighbor in the set of neighbors, adding an edge between the inserting node and the neighbor; and
    for each neighbor in the set of neighbors:
       defining a set of edge nodes comprising data nodes that are linked in the graph via an edge to the neighbor;
       using the edge selection process on the set of edge nodes to obtain a set of updated edge nodes;
       for any edge node in the set of edge nodes that is not in the set of updated edge nodes, removing the edge in the graph between the edge node and the neighbor; and
       for any edge node in the set of updated edge nodes that was not in the set of edge nodes, adding an edge in the graph between the edge node and the neighbor.

12. The processor-implemented method of claim 11 wherein the set of edge nodes comprises the inserting node.

13. The processor-implemented method of claim 8 wherein the search method comprises using a greedy search process.

14. The processor-implemented method of claim 8 wherein the set of candidate neighbors comprises more members than the set of neighbors of the inserting node.

15. A system for constructing a graph, the system comprising:

one or more processors; and a non-transitory processor-readable medium or media comprising one or more sets of instructions which, when executed by at least one of the one or more processors, causes steps to be performed comprising:

given a set of data nodes, performing at least two rounds of steps comprising:

for each data node in the set of data nodes, performing steps comprising:

inserting, if not already inserted, the data node into the graph;

using a search process to obtain a set of candidate neighbors in the graph for the data node;

applying to the set of candidate neighbors an edge selection process, which uses a selection criterion comprising whether a candidate neighbor in the set of candidate neighbors has an inner product with itself that is greater than inner products of the candidate neighbor with each neighbor in a set of neighbors, to obtain a set of neighbors of the data node; and updating edges in the graph; and outputting the graph.

16. The system of claim 15 further comprising, after outputting the graph, using the graph in a search process, given an input query, to obtain a set of one or more output results.

17. The system of claim 15 wherein the graph is an index graph.

18. The system of claim 15 wherein the step of updating edges in the graph comprises:

for each neighbor in the set of neighbors, adding an edge between the data node and the neighbor; and for each neighbor in the set of neighbors:

defining a set of edge nodes comprising data nodes that are linked in the graph via an edge to the neighbor;

using the edge selection process on the set of edge nodes to obtain a set of updated edge nodes;

for any edge node in the set of edge nodes that is not in the set of updated edge nodes, removing the edge in the graph between the edge node and the neighbor; and for any edge node in the set of updated edge nodes that was not in the set of edge nodes, adding an edge in the graph between the edge node and the neighbor.

19. The system of claim 15 wherein the set of edge nodes comprises the data node.

20. The system of claim 15 wherein the search process comprises using a greedy search.

* * * * *